United States Patent
Xia et al.

(10) Patent No.: US 8,042,412 B2
(45) Date of Patent: Oct. 25, 2011

(54) TURBOMACHINERY SYSTEM FIBEROPTIC MULTI-PARAMETER SENSING SYSTEM AND METHOD

(75) Inventors: Hua Xia, Altamont, NY (US); Norman Arnold Turnquist, Sloansville, NY (US); David So Keung Chan, Niskayuna, NY (US); Danian Zheng, Simpsonville, SC (US); Kevin Thomas McCarthy, Troy, NY (US); Richard Joseph Gawrelski, Amsterdam, NY (US); Matthew Damian Pietrzykowski, Clifton Park, NY (US); Alexander Seth Ross, Albany, NY (US); Yun Li, Niskayuna, NY (US); Juntao Wu, Schenectady, NY (US)

(73) Assignee: General Electric Company, Niskayuna, NY (US)

(*) Notice: Subject to any disclaimer, the term of this patent is extended or adjusted under 35 U.S.C. 154(b) by 43 days.

(21) Appl. No.: 12/215,094

(22) Filed: Jun. 25, 2008

(65) Prior Publication Data
US 2009/0320609 A1   Dec. 31, 2009

(51) Int. Cl.
*G01D 9/00* (2006.01)
*G01L 1/24* (2006.01)
*G01L 3/00* (2006.01)

(52) U.S. Cl. .................... 73/862.324; 73/650; 73/800

(58) Field of Classification Search .............. 73/800, 73/650, 862.325, 862.324
See application file for complete search history.

(56) References Cited

U.S. PATENT DOCUMENTS

| | | | | |
|---|---|---|---|---|
| 4,183,242 A | * | 1/1980 | Brown | 73/862.328 |
| 4,347,748 A | * | 9/1982 | Pierson | 73/862.324 |
| 4,687,344 A | * | 8/1987 | Lillquist | 374/124 |
| 5,001,937 A | * | 3/1991 | Bechtel et al. | 73/862.324 |
| 5,023,845 A | * | 6/1991 | Crane et al. | 73/800 |
| 5,214,278 A | * | 5/1993 | Banda | 250/231.14 |
| 5,253,531 A | * | 10/1993 | Walker et al. | 73/650 |

(Continued)

OTHER PUBLICATIONS

"Diagnosis of Thermal Efficiency of Advanced Combined Cycle Power Plants Using Optical Torque Sensor", Umezawa, Shuichi et al., Proceedings of PWR2005, ASME Power, Apr. 5-7, 2005, Chicago, Illinois, USA.

(Continued)

*Primary Examiner* — Lisa Caputo
*Assistant Examiner* — Jonathan Dunlap
(74) *Attorney, Agent, or Firm* — Ann M. Agosti

(57) ABSTRACT

A fiberoptic multi-parameter sensing system for monitoring turbomachinery system shaft static and dynamic torques, vibration modes and associated operation status includes a multi-furcated fiber bundle based optical splitter configured to transmit light to a surface of at least one turbomachinery system shaft through a plurality of optical fiber bundles disposed at a plurality of locations in proximity to the surface of the at least one shaft, in which the plurality of locations together are arranged in a substantially axial direction between the ends of the at least one shaft. The system further includes an array of high-temperature bifurcated fiber bundle based reflectance probes to receive reflectance signals from the shaft surface and send to an array of photosensitive detectors, configured to detect dynamic light reflected from the at least one turbomachinery system shaft surface in response to the transmitted light during rotation of at least one turbomachinery system shaft and generate dynamic reflected light signals there from. A sensing mechanism is configured to determine a torque or vibration on at least one turbomachinery system shaft in response to the dynamic reflected light signal signatures based on time-domain and frequency-domain signal processes.

27 Claims, 20 Drawing Sheets

U.S. PATENT DOCUMENTS

| | | | |
|---|---|---|---|
| 5,298,964 A * | 3/1994 | Nelson et al. | 73/800 |
| 5,301,559 A * | 4/1994 | Tsuji et al. | 73/862.326 |
| 5,438,882 A * | 8/1995 | Karim-Panahi et al. | 73/862.324 |
| 5,456,123 A * | 10/1995 | Parkinson | 73/862.326 |
| 5,474,813 A | 12/1995 | Walker et al. | 427/510 |
| 5,723,794 A | 3/1998 | Discenzo | 73/800 |
| 5,734,108 A * | 3/1998 | Walker et al. | 73/650 |
| 5,747,699 A * | 5/1998 | Ebi | 73/800 |
| 6,031,944 A | 2/2000 | Youngner | 385/12 |
| 6,318,187 B1 | 11/2001 | Griepentrog et al. | 73/862.324 |
| 6,460,422 B1 * | 10/2002 | Kuroda et al. | 73/862.324 |
| 6,513,390 B1 | 2/2003 | De La Puente et al. | 73/800 |
| 6,807,870 B2 * | 10/2004 | Kondo et al. | 73/862.324 |
| 6,865,959 B2 | 3/2005 | Kilmartin et al. | 73/862.331 |
| 6,948,381 B1 * | 9/2005 | Discenzo | 73/862.324 |
| 6,981,423 B1 | 1/2006 | Discenzo | 73/800 |
| 7,104,133 B2 * | 9/2006 | Kuroda et al. | 73/650 |
| 7,265,336 B2 | 9/2007 | Hataguchi et al. | 250/231.13 |
| 7,322,250 B1 * | 1/2008 | Discenzo | 73/800 |
| 7,444,882 B2 * | 11/2008 | Woo | 73/800 |
| 7,458,277 B2 * | 12/2008 | Discenzo | 73/800 |
| 7,559,258 B2 * | 7/2009 | Matzoll et al. | 73/862.08 |
| 2002/0033052 A1 * | 3/2002 | Kondo et al. | 73/800 |
| 2004/0255699 A1 | 12/2004 | Matzoll et al. | 73/862.324 |
| 2007/0034004 A1 | 2/2007 | Cripe | 73/331 |
| 2007/0056387 A1 * | 3/2007 | Obikawa | 73/862.324 |
| 2007/0068280 A1 | 3/2007 | Cripe | 73/862.331 |
| 2008/0041141 A1 * | 2/2008 | Discenzo | 73/66 |
| 2008/0236294 A1 * | 10/2008 | Woo | 73/800 |

OTHER PUBLICATIONS

"Low-Cost Optical Neural-Net Torque Transducer", Fred M. Discenzo et al., 1999, The Institution of Electrical Engineers.

"Diagnosis Of Thermal Efficiency Of Nuclear Power Plants Using Optical Torque Sensors", Umezawa, Shuichi et al., Proceeding of ICONE14, International Conference On Nuclear Engineering, Jul. 17-20, Miami, Florida, USA.

* cited by examiner

V-GROOVE LINE ENCODED SHAFT SURFACE

STRAIGHT LINE ENCODED SHAFT SURFACE

PERIODIC LINES
ENCODE SHAFT SURURFACE

TURBOMACHINERY SYSTEM FIBEROPTIC MULTI-PARAMETER SENSING SYSTEM AND METHOD

BACKGROUND

The invention relates generally to a fiberoptic multi-parameter sensing system and method for monitoring a turbomachinery system operation status, and more particularly to a system and method capable of providing simultaneously static and dynamic torque and vibration sensing from a turbomachinery system.

The measurement of the turbomachinery torques that varies along its shafts provides key information for design engineers to validate and improve the system efficiency. Also, mechanical misalignment, the rubbing motion between rotor and stator, distortion of shafts, slippage of couplings, and other random forces are normally causes for rotors and shafts suffering from static and dynamic torques, and flexural and torsional vibration that lead to most of fault events. Torques and vibrations are some of the critical parameters that may be measured to monitor power generation efficiency or degradation in a turbomachinery system, which may comprise a steam turbine, generator, load gear, and gas turbine. They can be measured by resistive strain gages, stationary proximity, magnetostrictive, and magnetoelastic sensors. These rotary based sensors must be mounted onto or in proximity to the rotor and shaft surface, which may not always be possible because of the space limitations. The operation of these conventional measurement technologies unfortunately suffers from the variation of the environmental conditions such as temperature, pressure, clearance, moisture, and electromagnetic interference. Since a typical turbomachinery system operates at temperatures from about 100° F. to about 1200° F., and under high humidity, it is exposed to varied torsional or flexural vibrations, and radial thermal expansion conditions due to large dynamic mechanical deformation and flexural and torsional vibrations. They all affect the accuracy and life of these sensing devices. Such sensing devices are therefore not reliable for long-term operation in large turbomachinery.

Rotor and shaft torque sensing include determining the amount of power a turbine, or other rotating device, generates or consumes. In the industrial world, ISO 9000 and other quality control specifications are now requested to measure torque during manufacturing, especially when fasteners are applied. There presently exists no practical sensing system that can measure both static and dynamic torque of a turbomachinery system, such as steam turbine rotor and shaft surface whenever the sensing location requires that sensing occurs under harsh conditions.

Known optical-based torque sensing techniques employ free-space-based laser beam deflection methods to measure torque by reflecting a laser beam from a micro-mirror that is embedded onto a shaft surface. Such devices are difficult to interface in a steam turbine environment due to the absorption of the laser beam by the steam, and also due to the optical surface maintenance requirements of the micro-mirror which is sensitive to the steam flow environment as well as the mechanical alignment and vibration.

Similar optical interference-based vibration measurement systems are known for measuring mechanical deformation and displacement but these systems are not designed for a turbomachinery system to provide steam turbine rotor shaft mechanical deformation associated with vibration detection because the thermal induced expansion makes it difficult to maintain optical focus and signal integrity in a dynamic environment.

All of the current technologies such as stationary proximity, resistive strain gages, magnetostrictive and magnetoelastic sensors, are not robust enough to survive in a turbomachinery system, such as a steam turbine environment, for the life of the machine, and all are temperature sensitive. Such a thermal-sensitive property has caused serious reliability issues and are the cause of inaccuracies.

Another problematic issue related to current technologies is directed to the installation parameters of these conventional torque/vibration-sensing devices in the turbomachinery system, such as steam turbine environment, including without limitation, moisture, pressure, fluctuated electromagnetic field interference, temperatures of 100° F.-1200° F., and rotor flexural or torsional vibration. A strain gage, for example, needs to be mounted on the rotor surface, and a magnetostrictive sensor needs to be mounted close to the shaft surface with a gap or clearance less than a few hundred micrometers. Temperature fluctuations in a turbomachinery system, such as different stages of a steam turbine, induce significant transient rotor thermal expansion and flexural or torsional vibration. In a harsh environment, reliable torque and vibration measurements among steam turbine-generator, generator-load gear, and load gear-gas turbine sections and among individual steam turbine stages will allow performance to be monitored and maintenance outages to be more optimally scheduled, maximizing turbine availability and output.

Further, flexural and torsional vibrations caused by shifts of load in the steam turbine-generator, generator-load gear, and load gear-gas turbine can produce transient oscillations that exceed steady state stress levels under full load conditions. Such transient nonlinear vibrational events can induce bearing wearing, bending deformation of shafts and high torque loading, and threatens the stability of a steam turbine power generation system, among other effects. Conventional vibration sensing technology such as accelerometers, strain gages, proximity probes and tachometers may be limited either by steam turbine harsh environment conditions including without limitation, temperature, pressure, steam, dust particles, moisture and high flow rate, or by their nature as contact and electrical sensing devices.

Under normal shaft operating conditions that correspond to stable equilibrium status, the observed low-frequency random vibration signal although small, could be the result of the rubbing motion between rotor and stator, distortion of shafts, slippage of couplings and other random forces. Flexural vibration modes are caused mainly from a rotating system mechanical misalignment, temperature distribution and unbalance; while the torsional vibration may be due to shaft loading condition variation-induced torque dynamics and transient rotating speed variations. External unknown excitation forces, transient power switching and unstable global system operation can also induce transient nonlinear vibration modes that could have high vibration amplitudes. In addition, deterioration of the turbine blades will reduce output and can be monitored via a reduction in torque and vibration frequency variations.

In view of the above, it would be both advantageous and beneficial to provide a practical solution for an online turbomachinery system, such as a steam turbine, torque and vibration analysis for improving power generation performance as well as power generation efficiency control and optimization. This solution should provide a reliable means of measuring static and dynamic torque, linear and nonlinear vibrations from rotating shafts or a reliable means of fault event diagnostics and prognostics. Reliable torque and vibration measurements between turbine sections and between individual turbine stages in a turbomachinery system will allow performance to be monitored and maintenance outages to be more optimally scheduled, maximizing turbomachinery system power generation efficiency. It would be further advantageous if the system and method of static and dynamic torque sensing for a turbomachinery system could be easily adapted to also reliably measure linear and non-linear shaft vibration characteristics.

BRIEF DESCRIPTION

Mechanical misalignment, the rubbing motion between rotor and stator, distortion of shafts, slippage of couplings, and other random forces are normally causes for rotors and shafts suffering from static and dynamic torques; while shifts of load in the steam turbine-generator, generator-load gear, and load gear-gas turbine can produce transient flexural and torsional oscillations that may exceed steady state stress levels under full load conditions. In return, such transient nonlinear vibrational events can also induce bearing wearing, bending deformation of shafts and high torque loading, and threatens the stability of a steam turbine power generation system, among other effects.

Power generation efficiency improvement and optimization, fault event diagnostics and prognostics from a turbomachinery system need to be monitored by an online sensing system. The embodiments described herein provide a reliable means of measuring static and dynamic torque, linear and nonlinear vibrations from rotating shafts either inside the steam turbine, or in-between steam-generator, generator-load gear, load gear-gas turbine. Any solution also needs to be practical for sensing probe installation in a harsh environment that can satisfy the required operation condition in temperature, moisture, pressure, and flow rate etc.

Fiber optical based transmittance and reflectance measurements can be used for different sensing applications. The delivery of the light and the pick up of the signal have to be through hermetical sealed cables. More importantly, the sensing signals either for interrogating static and dynamic parameters, such as torques, or for interrogating linear and nonlinear parameters, such as flexural and torsional vibration modes, have to be decoded and analyzed.

There is therefore a need for providing a field deployable, hermetically packaged fiber sensing probe, a multi-parameter sensing system and method, and installation solution suitable for simultaneously sensing distributed, steady and dynamic parameters in an extremely harsh environment, such as a turbomachinery system in general and a steam turbine in particular.

One embodiment of the present invention comprises a fiber bundle based light splitter. Such an optical device effectively splits light from a single light source for light transmission to multiple locations. The light source, according to one embodiment, comprises: a plurality of multimode fibers, configured either in a random, half-and-half, regular, or coaxial patterns. These fibers are bonded together by high-temperature ceramic adhesive, and sealed by metal material, such as stainless steel.

Another embodiment of the present invention comprises a 1×2 fiber bundle based reflectance probe. Such an optical device effectively delivers light source to a sensing location, and meanwhile picks up reflectance from a shaft surface. It comprises: a plurality of multimode fibers, configured either in a random, half-and-half, regular, or coaxial patterns. These fibers are bonded together by high-temperature ceramic adhesive, and sealed by anti-oxidazation metal material, such as Inconel. Part of the fibers are configured for light delivery and part of fibers are configured for sensing signal pick up.

Another embodiment in this invention comprises an optical encoding method using embedded v-grooves or micromachining produced periodic or aperiodic patterns, and straight lines that are inscribed onto circumference of a shaft. The aperiodic encoding pattern is used for static torque sensing, while the periodic and straight lines are used for dynamic torque and torsional vibration detection.

In accordance with another embodiment, a fiberoptic sensing system and method is provided that comprises a light source configured to transmit light to multiple shaft surface locations of a turbomachinery system via a 1×N optic fiber bundle, the plurality of shaft surface locations arranged in a substantially axial direction between the ends of at least one shaft, such that a plurality of dynamic reflected light signals are received from the plurality of shaft surface locations while at least one shaft is loaded; wherein the reflected signal from any location is picked up with a hermetical sealed 1×2 reflectance probe; and the signals from multi-reflectance probes are sent to an array of photosensitive detectors for further analyses in both time-domain and frequency-domains. The torques and torsional vibration are encoded either by a mechanically inscribed v-groove or by a micromachining produced patterns. One embodiment of the fiberoptic sensing system and method comprises an array of photosensitive detectors, configured to detect dynamic light reflected from the at least one turbomachinery system shaft surface in response to the transmitted light during rotation of the at least one turbomachinery system shaft and generate dynamic reflected light signals there from. The shaft torque and vibration characteristics are determined based on at least one characteristic of the reflected light signals received from the encoded shaft surface either from continuous light excitation or from frequency modulated light and lock-in based signal process.

According to another embodiment, a fiberoptic sensing system for sensing turbomachinery system flexural vibration modes and nonlinear vibration event associated operation status comprises a frequency modulated light source configured to transmit light to multiple shaft surface locations of a turbomachinery system via a 1×N optical coupler, the dynamic reflected light signals being received with multiple hermetically sealed 1×2 reflectance probes that are connected to an array of photosensitive detectors for signals analyses in both time-domain and frequency-domains. The fiber reflectance probes are disposed at a plurality of locations in proximity to the shaft surface that doesn't require a mechanical or optical encoded shaft surface. One embodiment further comprises an array of photosensitive detectors, which may be a charge-coupled detector (CCD) or a complementary metal-oxide-semiconductor (CMOS) detectors configured to detect dynamic light reflected from the at least one turbomachinery system shaft surface in response to the dynamic reflected light signals there from. Fast Fourier transfer of the measured dynamic reflectance is used to determine linear and nonlinear constant and instantaneous turbomachinery system vibrational status.

DRAWINGS

These and other features, aspects, and advantages of the present invention will become better understood when the following detailed description is read with reference to the accompanying drawings in which like characters represent like parts throughout the drawings, wherein.

Figure 10:
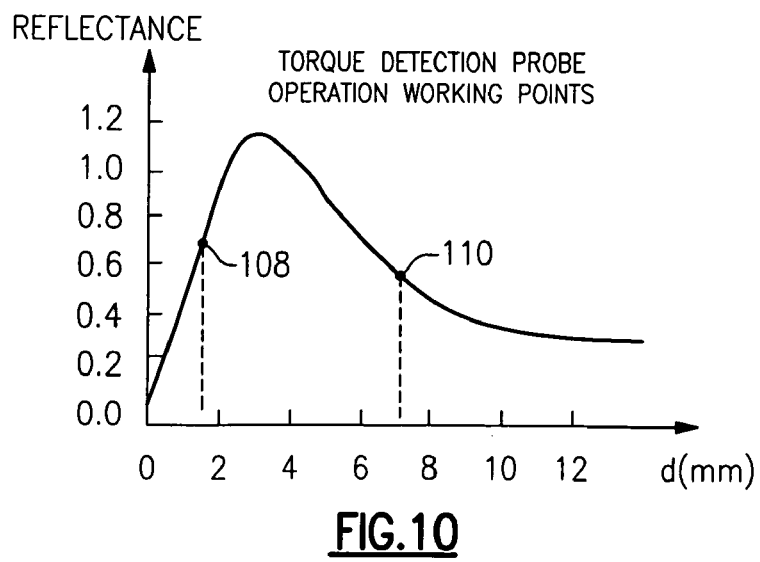
FIG. 10 illustrates reflectance levels at different operation working points for the torque detection probe shown in FIG. 9.
Figure 12:
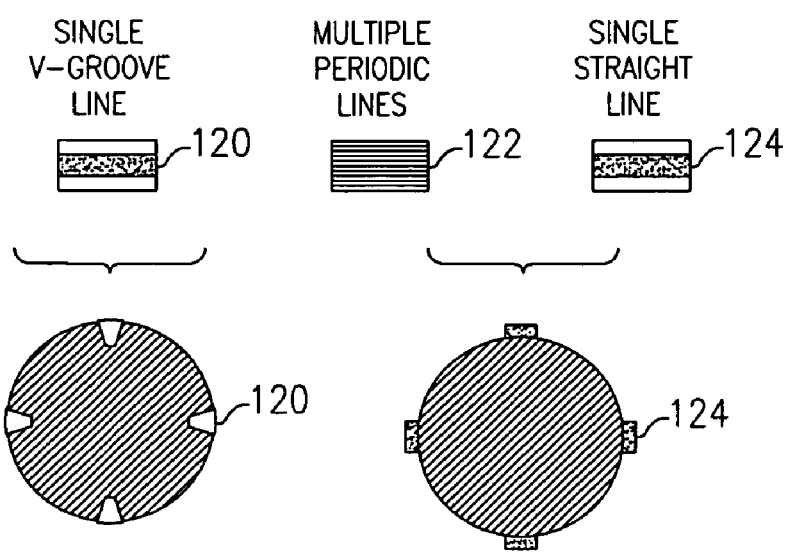
Figure 13:
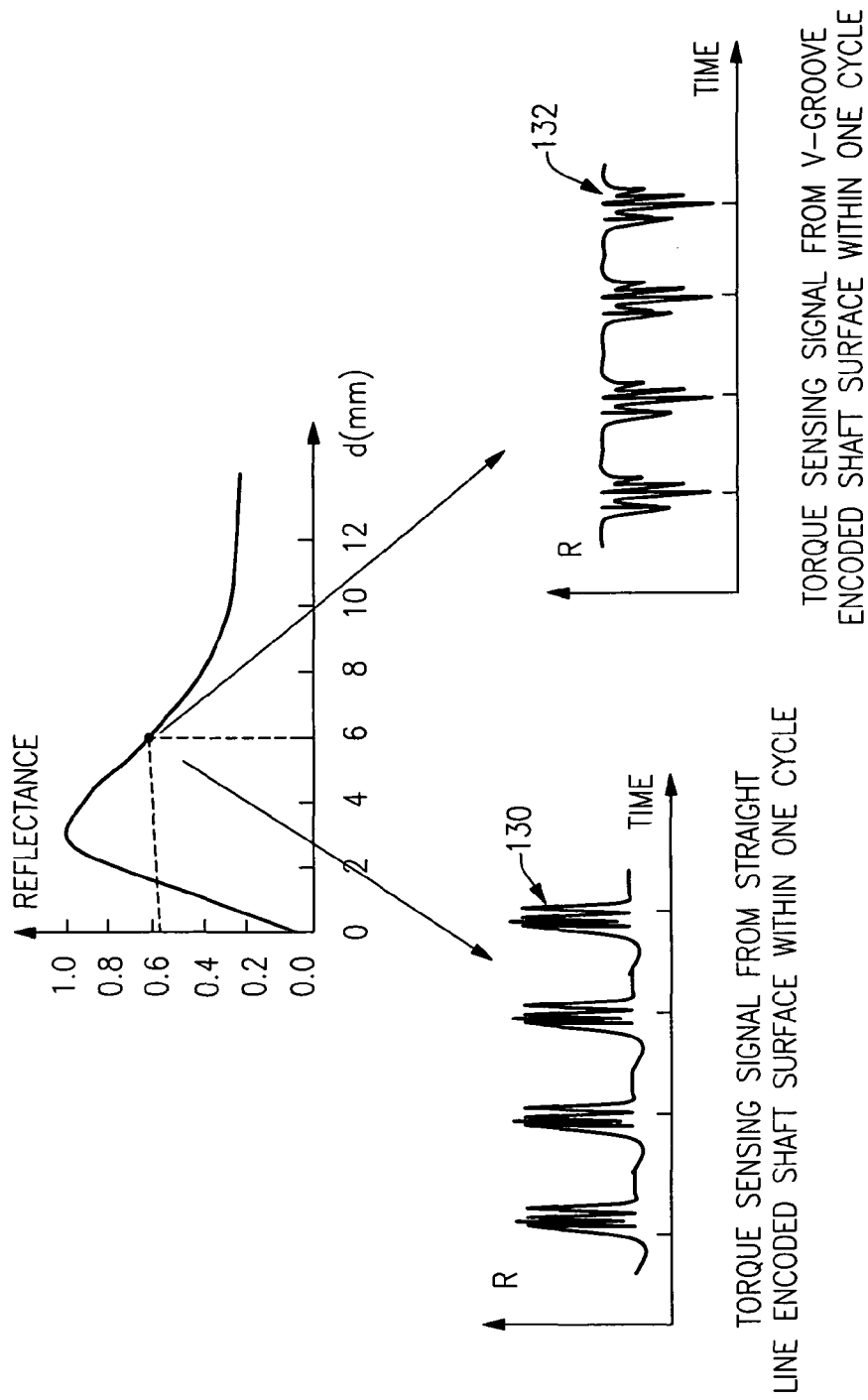
Figure 14:
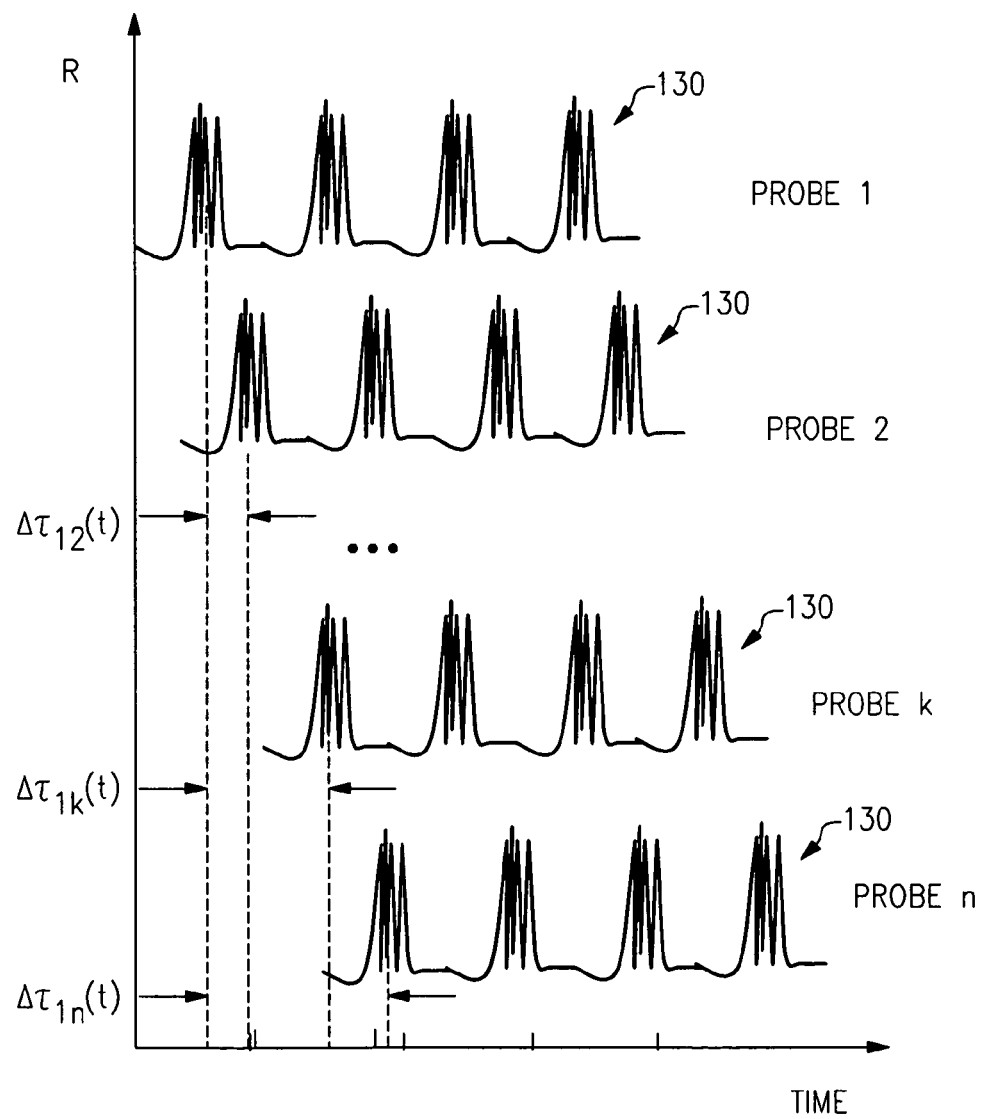
Figure 15:
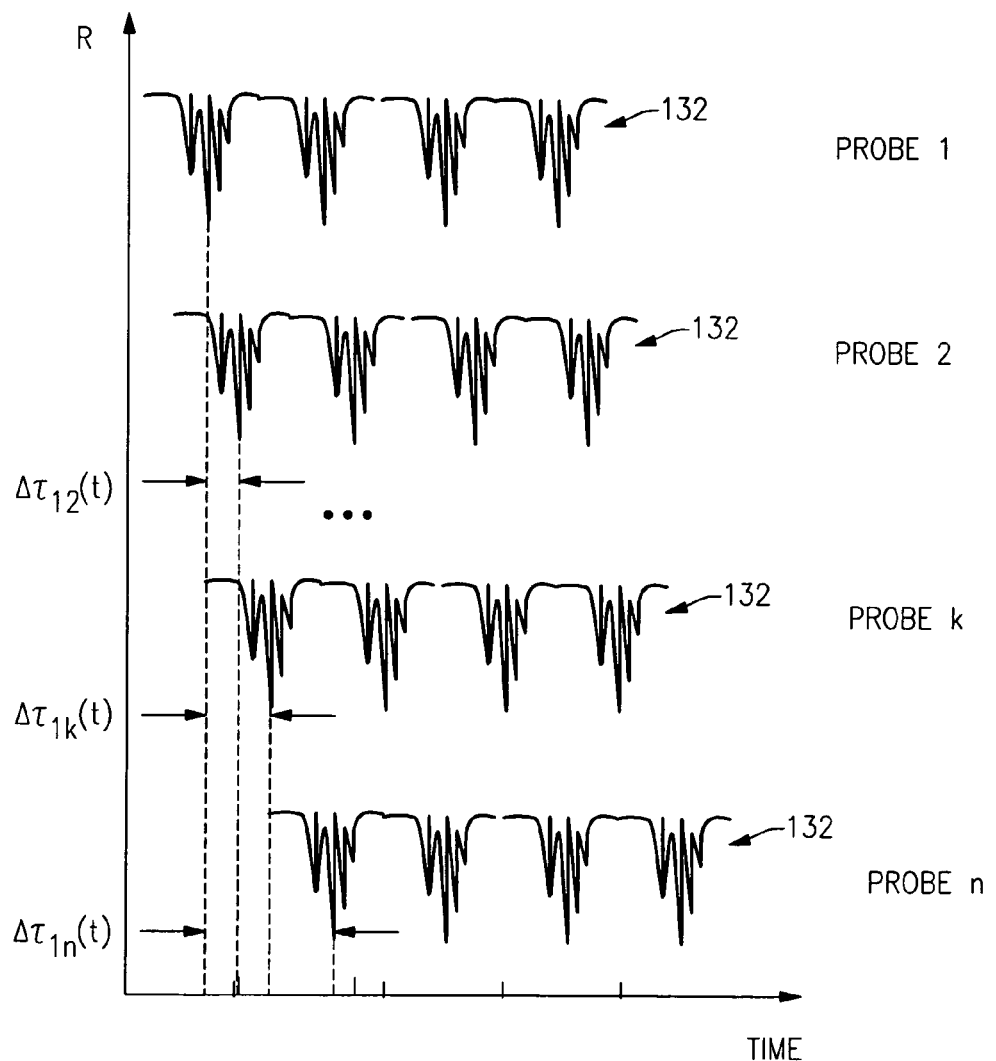
Figure 16:
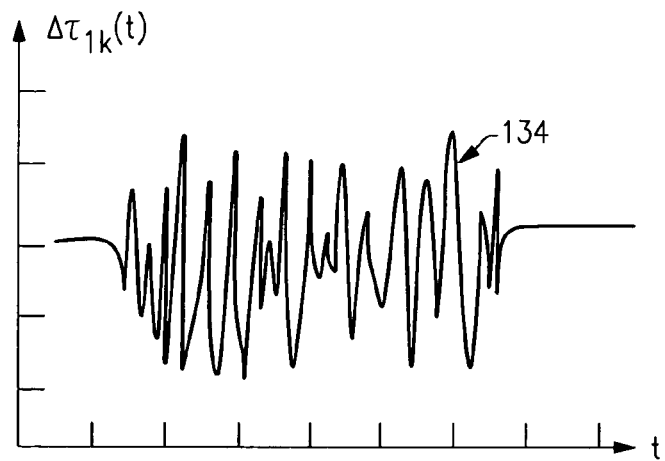
Figure 17:
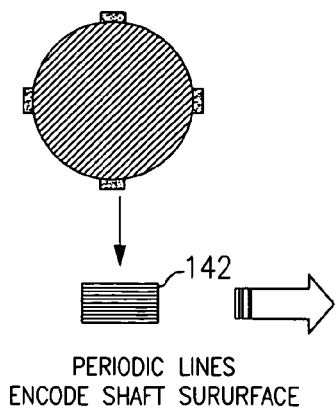
Figure 17:
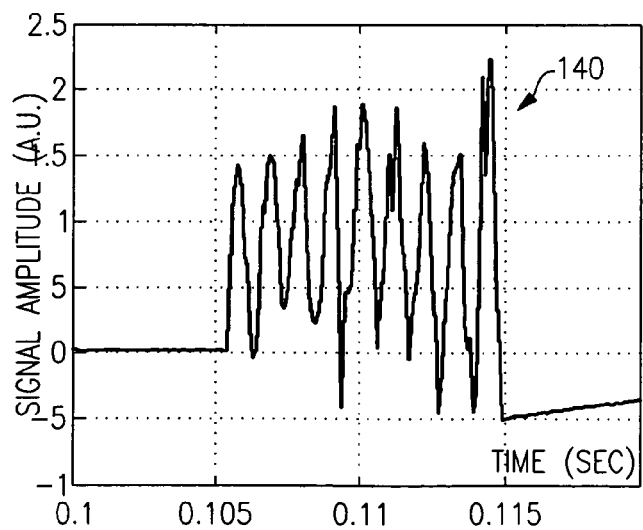
Figure 18:
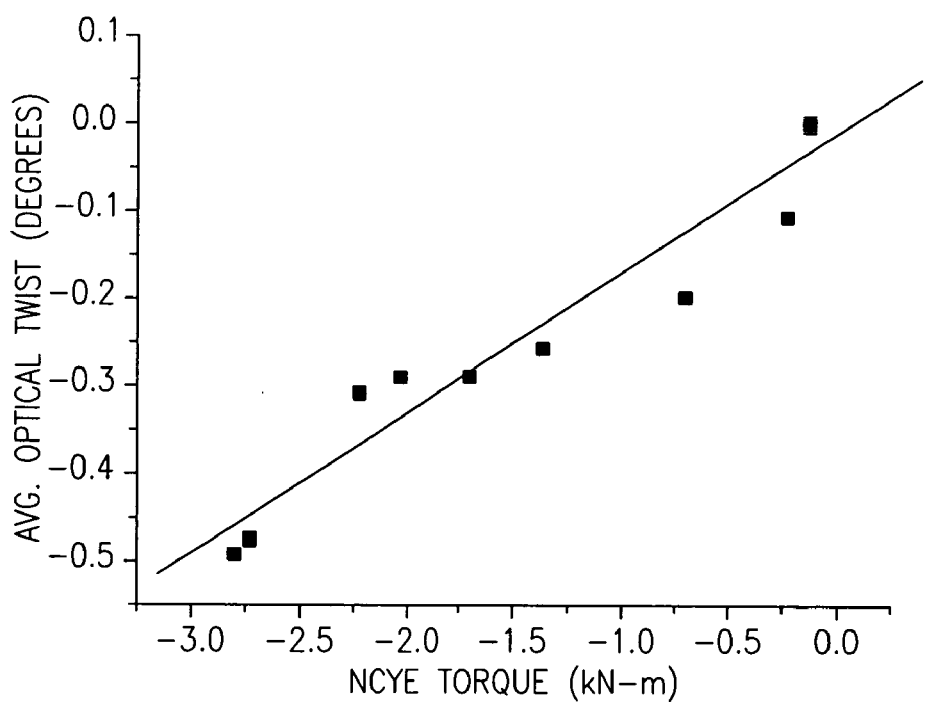
Figure 19:
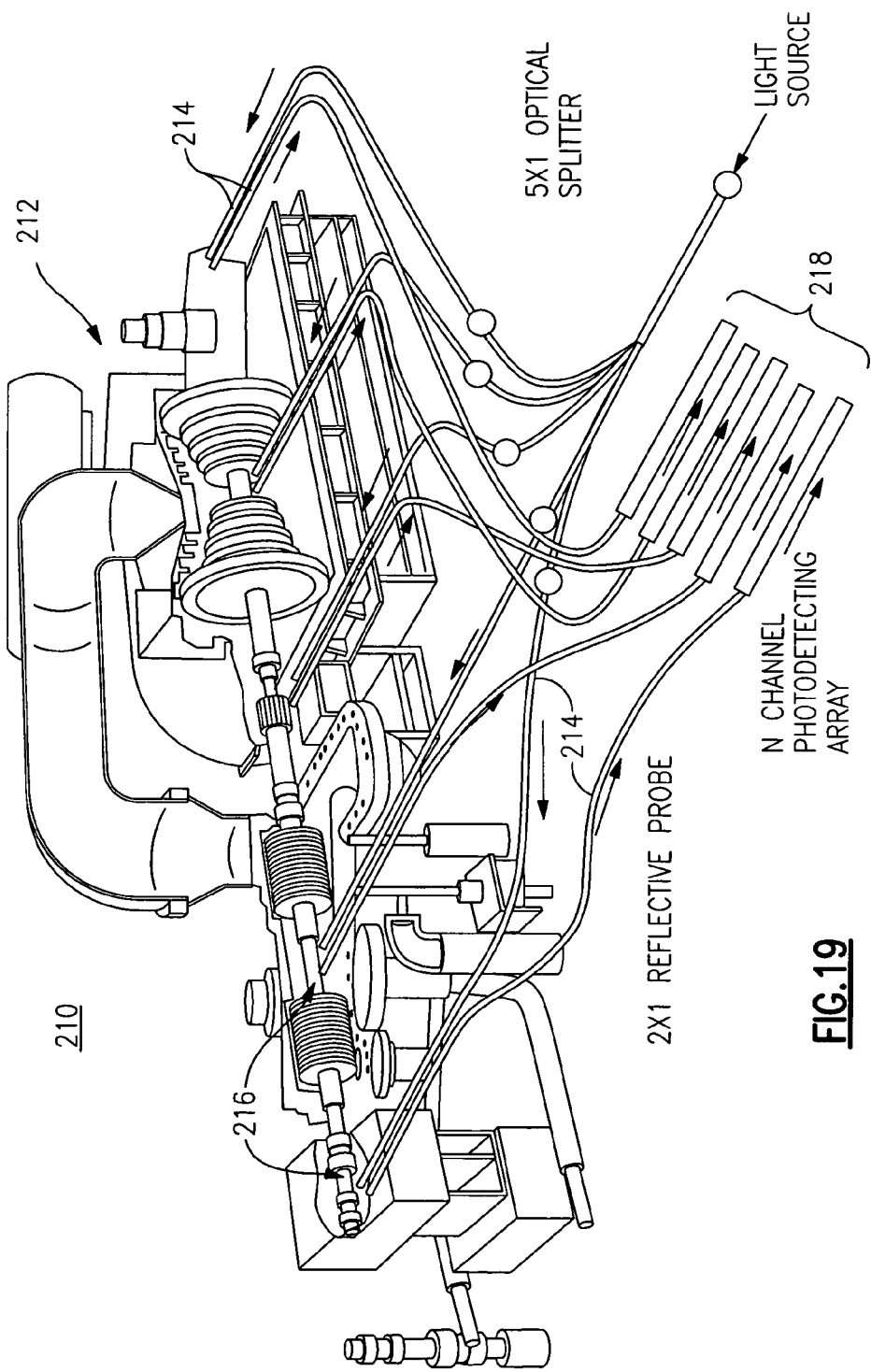
Figure 20:
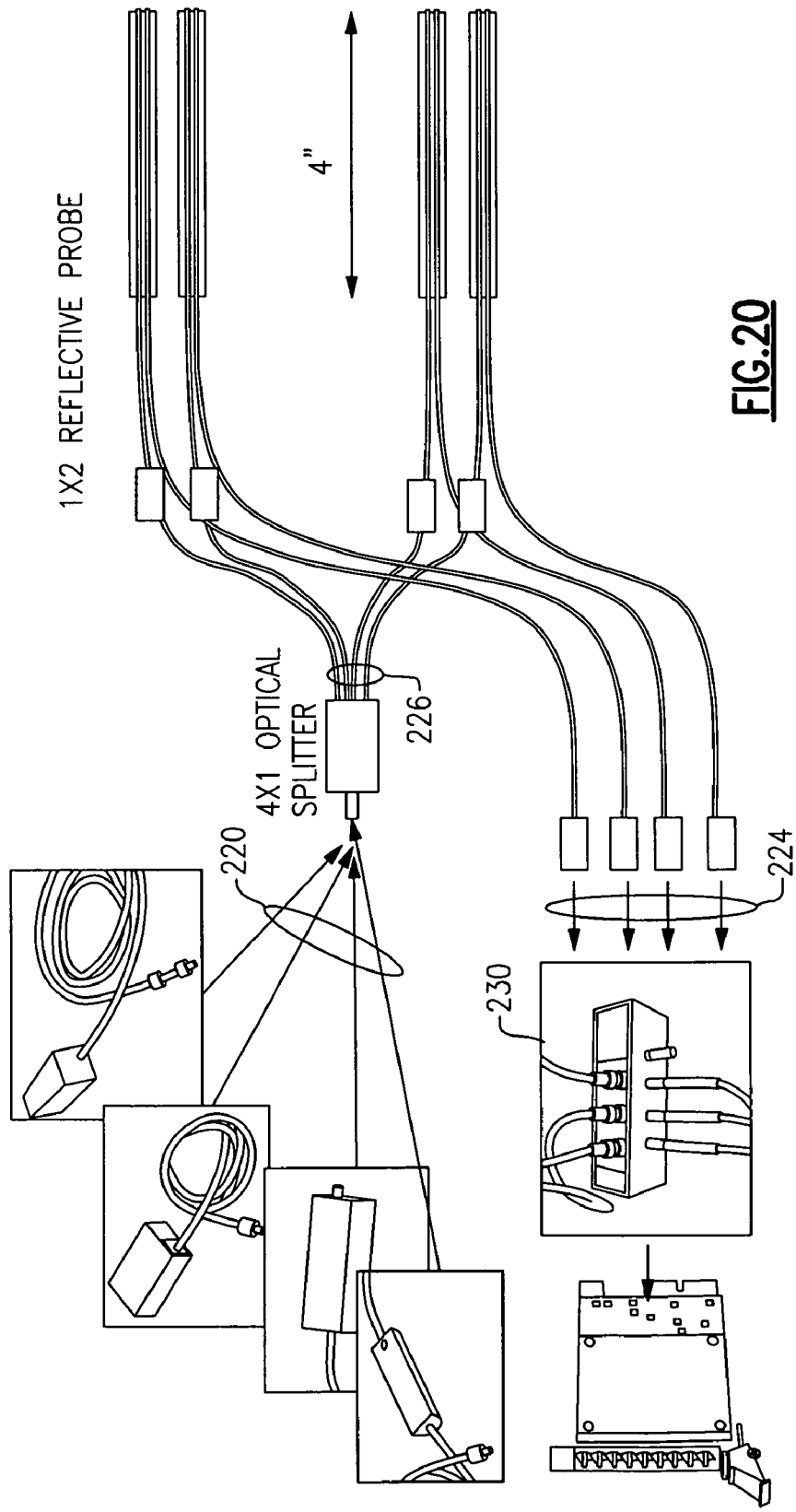
Figure 21:
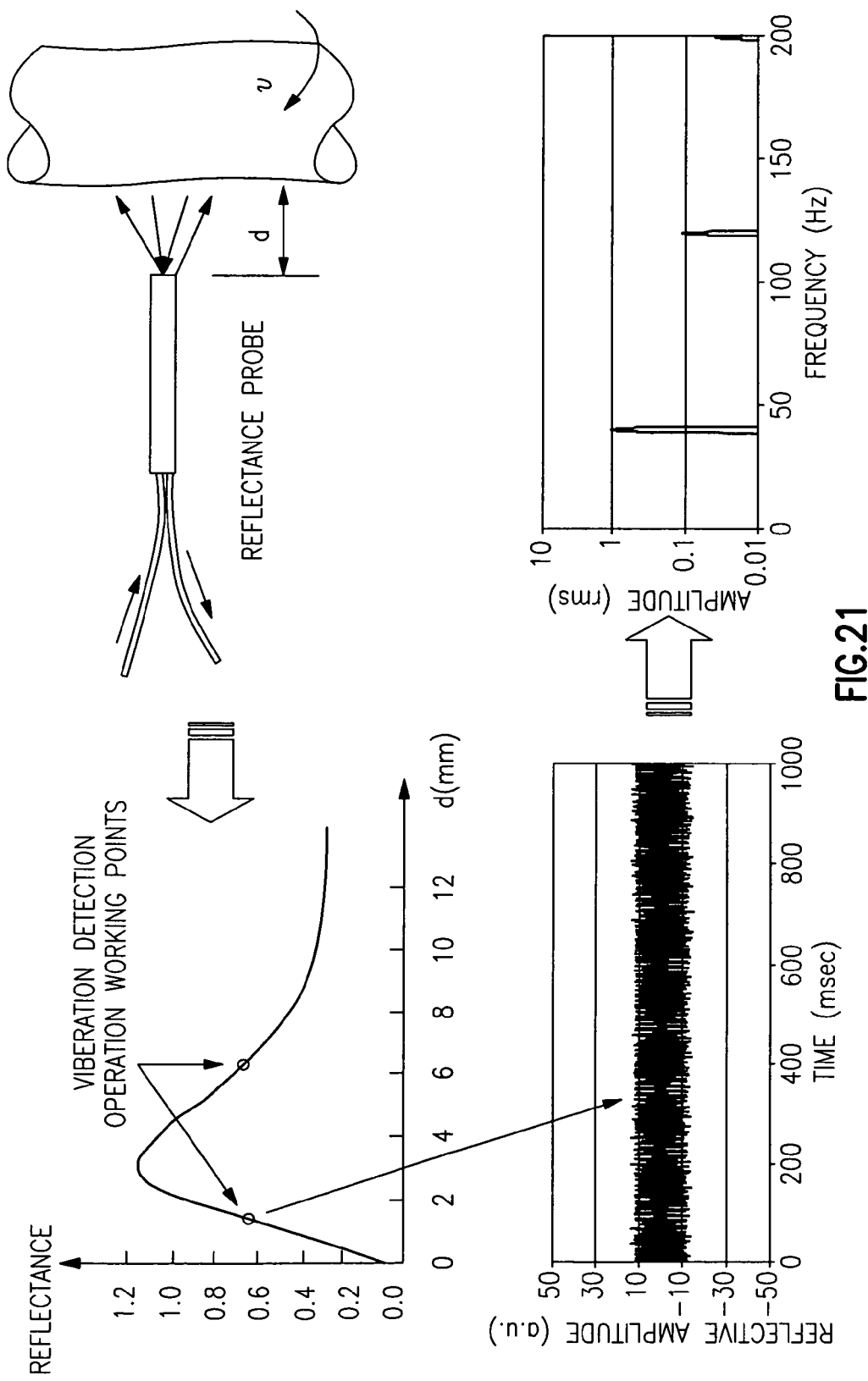
Figure 22:
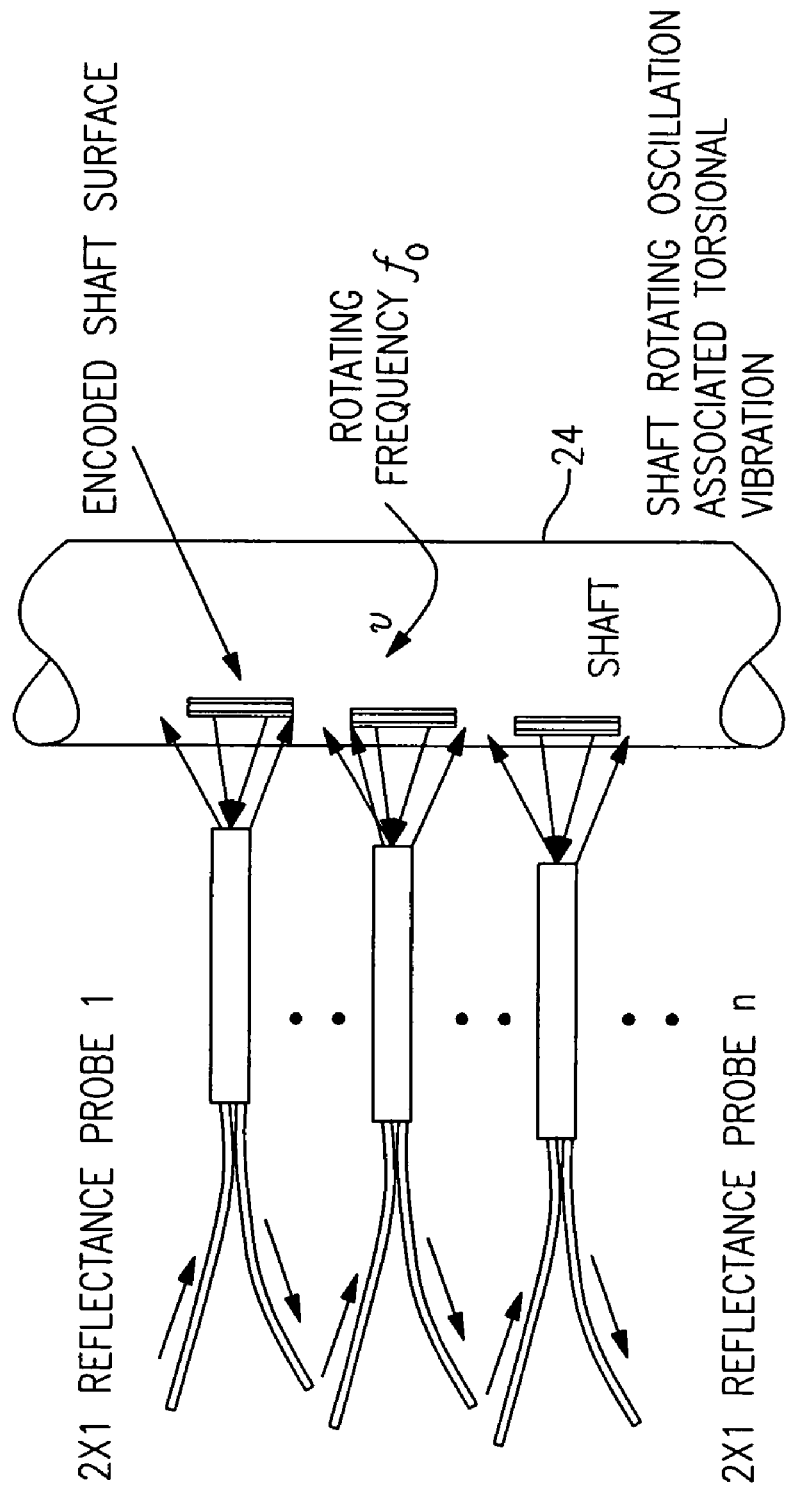
Figure 23:
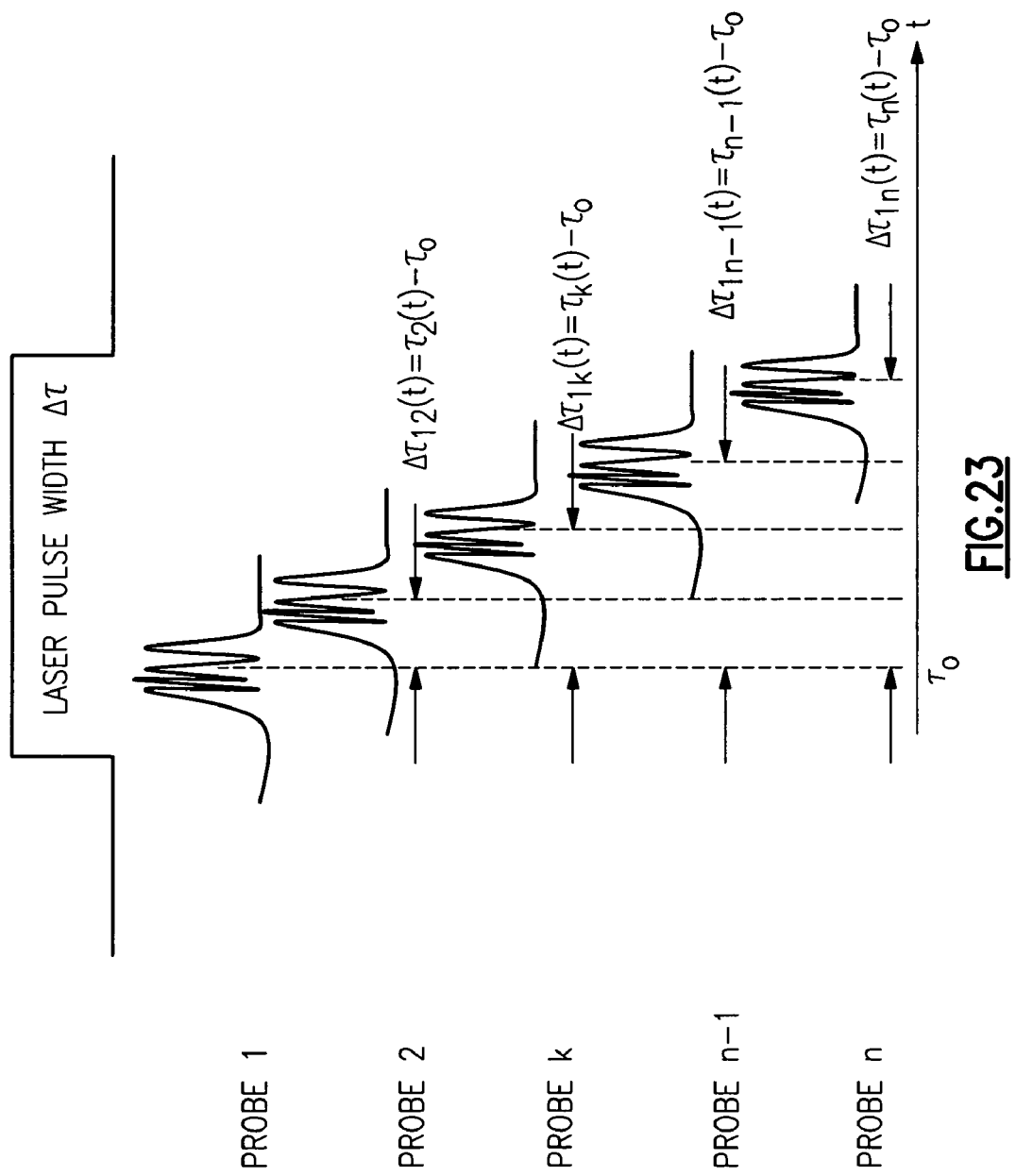
Figure 24:
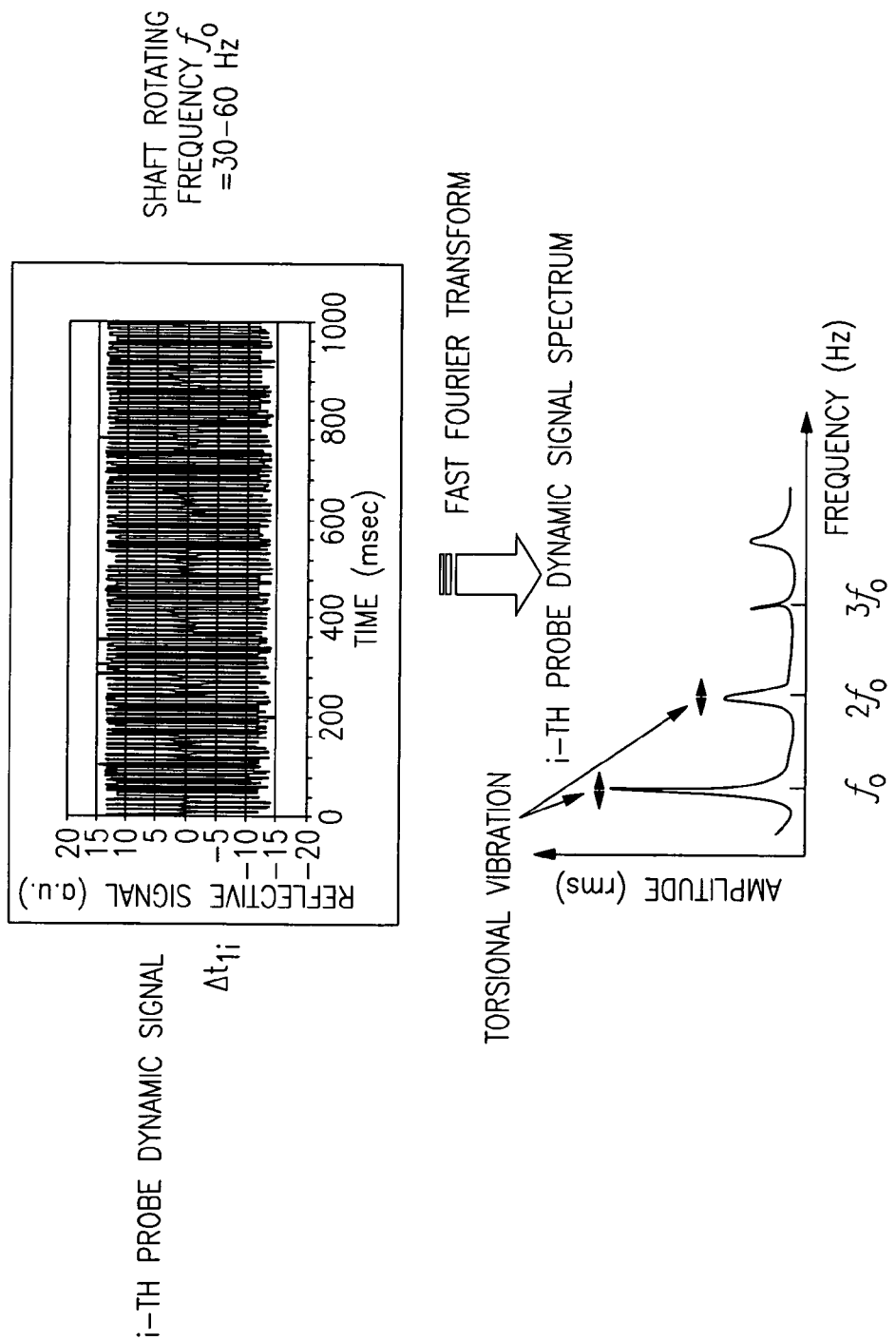

FIG. 12 further details three shaft surface encoding patterns, shown in FIG. 10;

FIG. 13 illustrates torque sensing signals from different encoding patterns at one operation working point;

FIG. 14 illustrates static torque signals from different probes from a straight line encoded shaft surface within one cycle;

FIG. 15 illustrates static torque signals from different probes from a v-groove line encoded shaft surface within one cycle;

FIG. 16 is graphic representation of dynamic torque detection from time delay between the first probe and k-th probe as a function of the time;

FIG. 17 is a graphical representation of the reflective signal from a periodic lines encoded shaft surface according to one embodiment of the invention;

FIG. 18 is graphical representation of the measured torque and corresponding twist angle according to one embodiment of the invention;

FIG. 19 illustrates one portion of a fiberoptic vibration monitoring system for a steam turbine according to one embodiment of the invention;

FIG. 20 illustrates a technique for transmitting laser light signals via an optic fiber bundle to four reflective probes and receiving multiple reflective signals from four reflective probes in response thereto, according to one embodiment of the invention;

FIG. 21 illustrates dynamic reflectance based flexural vibration signal detection principles according to one embodiment of the invention;

FIG. 22 illustrates a multi-point dynamic reflectance based torsional vibration signal detection technique according to one embodiment of the invention;

FIG. 23 illustrates a multi-point dynamic reflectance based torsional vibration time-domain signal according to one embodiment of the invention; and FIG. 24 illustrates a multi-point dynamic reflectance based torsional vibration spectrum from a probe according to one embodiment of the invention.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

A fiberoptic-based harsh environmental static and dynamic torque and vibration sensing system according to one embodiment is described herein for improving turbomachinery system power generation efficiency, or monitoring degradation status and potential fault events. Different from conventional temperature sensitive stationary proximity, magnetostrictive, and magnetoelastic sensors, the fiberoptic multi-parameter sensing system embodiments described herein are thermally insensitive and multiplexed by multifurcated fiber bundle probes that either are distributed in different pressure stages in a steam turbine or are deployed in-between steam turbine-generator, generator-load gear, load gear-gas turbine, and/or between compressor stages, for multi-point turbomachinery system structural health condition monitoring.

Figure 1:
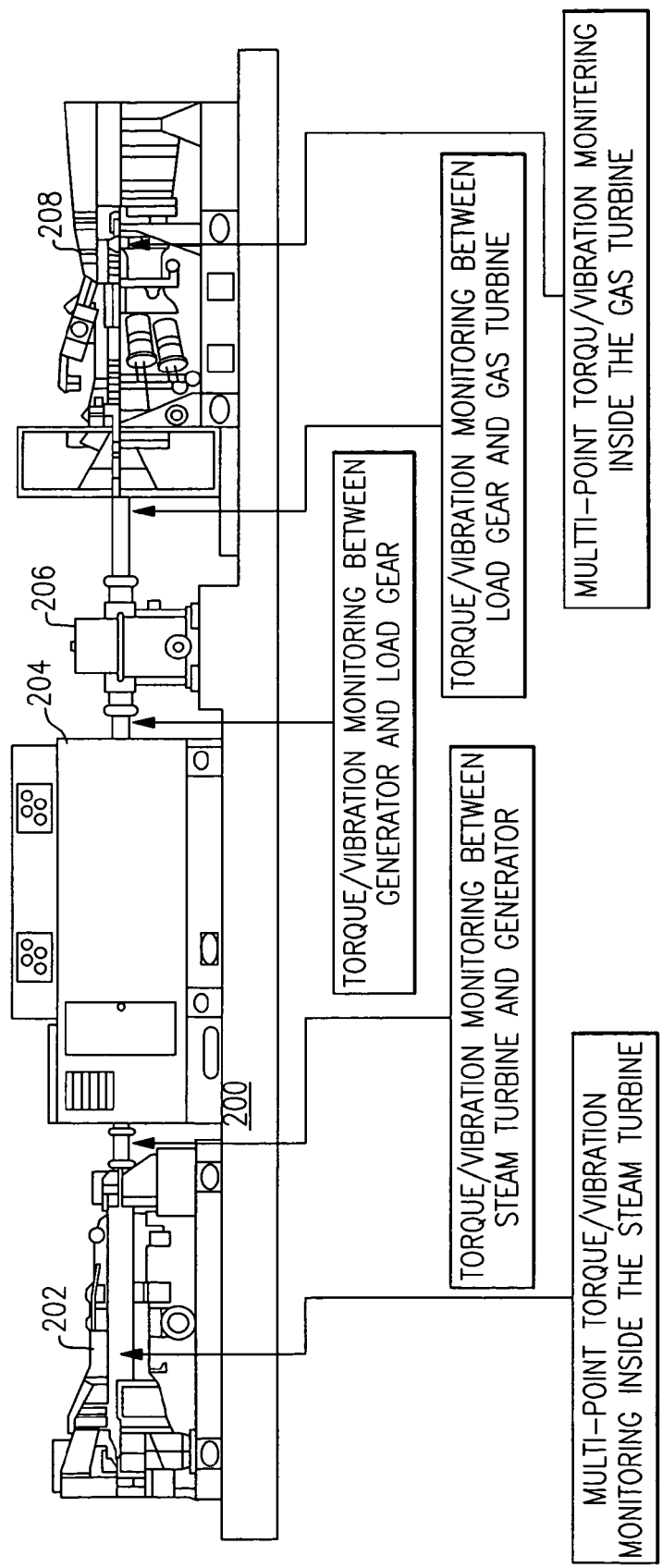
FIG. 1 illustrates turbomachinery system fiberoptic torque and vibration sensing instrumentation according to one embodiment of the invention.

FIG. 1, for example, illustrates turbomachinery system fiberoptic torque and vibration sensing instrumentation 200 according to one embodiment of the invention. Fiberoptic torque and vibration sensing instrumentation 200 is configured to perform multi-point turbomachinery operation status or condition monitoring inside a steam turbine 202, between the steam turbine 202 and a generator 204, between the generator 204 and a load gear 206, between the load gear 206 and a gas turbine 208, and inside the gas turbine 208. The fiberoptic sensing system can be locally distributed either in the steam turbine or in the gas turbine, or generally distributed in the turbomachinery system from steam turbine, generator, load gear to gas turbine for fault event diagnostics, prognostics and long term performance monitoring.

Figure 2:
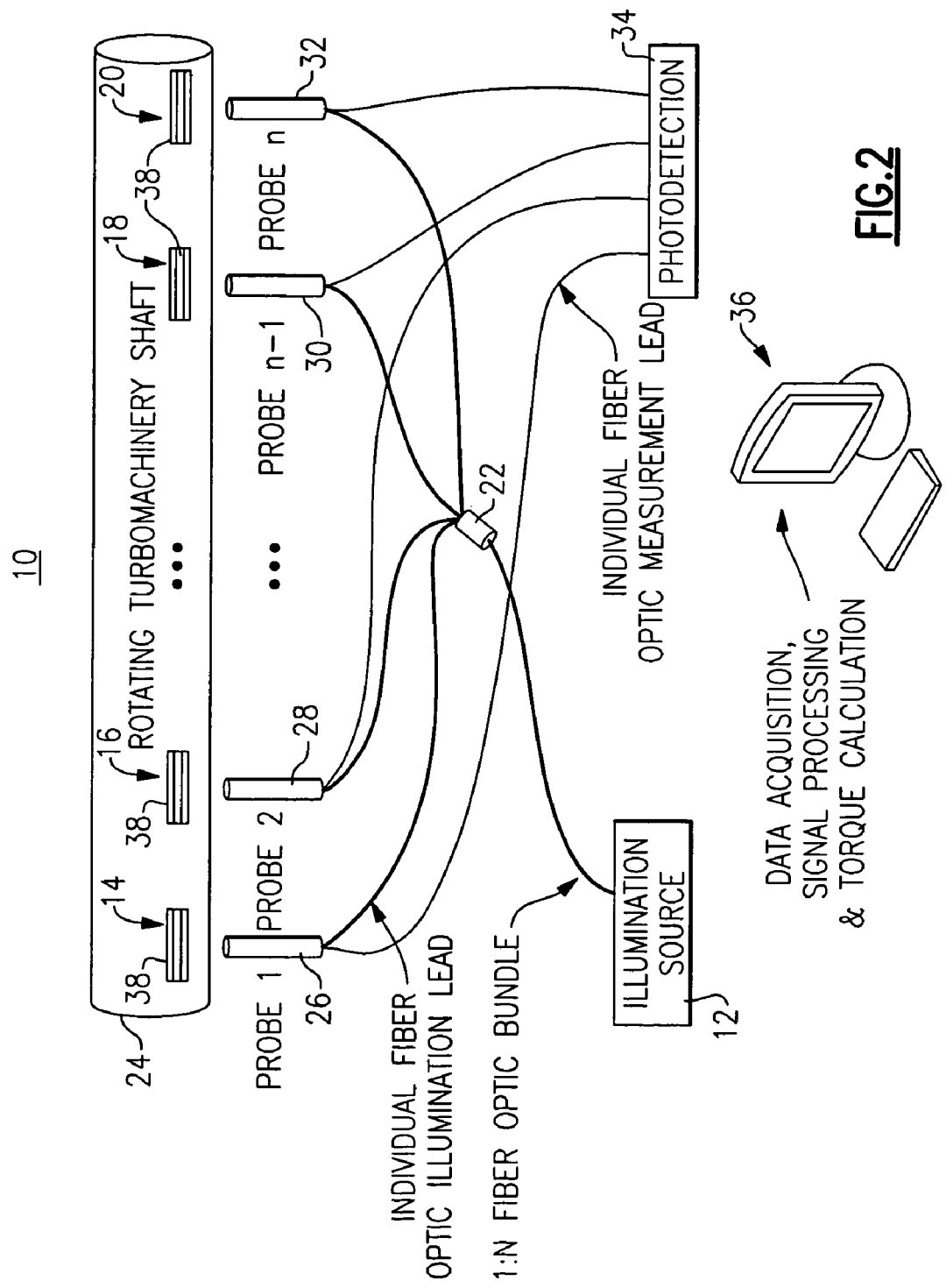
FIG. 2 is a diagram illustrating a fiberoptic phase-shift-based torque sensing system for a steam turbine according to one embodiment of the invention.

One embodiment of the a fiberoptic sensing system described now with reference to FIG. 2 for multi-fiber bundle sensing probes deployed along a shaft surface 24, includes a multi-color illumination (e.g., multi-wavelength lasers or broadband LED) source 12 of visible (405-671 nm) to near infrared (1.0-1.7 μm) that is either modulated in the microsecond pulse duration or operated in continuous mode. The illumination source is splitted into multiple branches by a 1×N optical splitter and send to different areas 14, 16, 18, 20 on a turbomachine shaft surface 24, each area including an either an optical or a mechanical encoding mechanism 38, a 1×2 high-temperature fiber bundle-based reflectance probes 26, 28, 30, 32, are used to receive reflectance signal in proximity to the shaft surface, and send these signals to an array of photosensitive detectors 34 and a signal processing unit 36. If light source is modulated, a multi-channel count lock-in amplifier provides the requisite handshaking between the high-speed photodiode detector array 34 and the multi-color illumination source 12.

The illumination source can be continuous wave that allow all the reflectance probes 26, 28, 30, 32 to detect maximum reflectance signatures from the optical encoded shaft surface 14, 16, 18, 20. The static signal reflected from the at least one turbomachinery system shaft surface is analyzed by differentiating the reflectance signatures from any two probe signals. The static shaft twist or torque is determined from difference between optical encoded signal signatures of any two-reflectance probes.

A light signal duration is first modulated to allow all the reflectance probes 26, 28, 30, 32 to detect maximum reflectance difference from the shaft surface encoders 38. The dynamic signal reflected from the at least one turbomachinery system shaft surface is analyzed by differentiating the time delay between any two probe signals. The time delay is based on shaft encoded induced reflectance signatures from any two-reflectance probes. The dynamic shaft torque is then determined by shaft rotating velocity, and shaft material elastic modulus.

A feature provided by the dynamic torque sensing system 10 is that the torque can be detected either by modulating the light pulse duration to be equal to the time that is required to catch the torque-induced time delay or by differentiating the rising signal time delay emanating from encoded high-reflective strip edges on the turbomachine shaft surface 24. Furthermore, the Fast Fourier transform on a reflectance signature signal could provide online analysis on both torsional vibration and fault associated vibrational modes.

Another feature provided by the static and dynamic torque sensing system 10 is its phase based torque determination that doesn't depend upon the reflected signal intensity and thereby is not adversely affected by reflectance degradation or scattering light fluctuation due to corrosion, shaft surface erosion, or contaminants in the optical path between the reflectance probes 26, 28, 30, 32, and the shaft surface encoders 38.

A third feature is directed to a relatively larger clearance (1-10 mm) between the turbomachine shaft surface 24 and the reflectance probes 26, 28, 30, 32 that provides a convenient installation method that is tolerant to the turbomachine rotor flexural or torsional vibration and radial thermal expansion.

Still another feature provided by the static and dynamic torque sensing system 10 is its multi-wavelength illumination source 12 that ensures torque sensing is insensitive to moisture, hydrocarbon oil, and dirt by differential simultaneous torque sensing either with two or with multiple wavelengths of light sources. On the other hand, the shaft surface encoders surrounding shaft circumference further mitigate potential distorted reflectance signatures from a dirty contaminated encoder.

One embodiment of the torque sensing system 10 has demonstrated a better than 0.05 degree torque sensing resolution during operation at ambient room temperature and the resolution should be better than 0.1 degree at about 1200° F.

In summary explanation, a fiberoptic sensing system 10 provides a stand-alone instrument that can be simply installed in a turbomachinery system, such as a steam turbine, for rotor shaft torque monitoring at different pressure stages. The main components of this instrument are an illumination source (e.g., a multi-color laser, or broadband LED) 12, a multifurcated fiber optical splitter 22, a 1×2 high-temperature reflectance sensing probe array 26, 28, 30, 32, an array of photosensitive detection 34, a signal processor 36 and related signal processing software. The encoded shaft surface enables such a fiberoptic sensing system to measure some critical parameters such as static torque, dynamic torque and rotor torsional vibration. Other features include:

The fiberoptic based sensing system 10 is wavelength multiplexing based technology integrated with phase shift and FFT-based signal encoded processing. The sensing signal is sent to and from the encoded shaft surface 24 via high-temperature tolerable fibers 26, 28, 30 and 32 to provide a shaft operation condition monitoring method that is passive to any transient power fluctuation induced electromagnetic interference.

The simultaneous torque and torsional vibration detections provide both "static" and "dynamic" sensing methods with one fiberoptic reflectance-based sensing system that can be scaled down to a sub-system such as a steam turbine or scaled up to whole turbomachinery system in a power plant. The combination of the static and dynamic responses provides a unique solution to overcome current stationary proximity, resistive strain gage, magnetostrictive, and magnetoelastic sensor problems associated with baseline drift and frequent recalibration, as well as the electromagnetic interference issue.

Since a turbomachinery system includes steam turbine, gas turbine, and generator, most of these sub systems, are operated at temperatures from ambient to about 1200° F. and at varied pressures, varied vibration and rotor thermal expansion that may seriously affect the reliable use of these sensing devices. The multifurcated fiber bundle based reflectance detection probes 26, 28, 30, 32 can tolerate high temperatures and pressures, and are flexible enough to be deployed at any shaft surface position; and thereby provides an environmental condition insensitive monitoring method.

The fiberoptic reflectance sensing probes 26, 28, 30, 32 can be deployed as an array, and hence a single laser or LED light source can be split into many individual sensing-probes rendering higher spatial resolution of measurement. Thus, a fiberoptic sensing system 10 is ideal for applications that require either localized sensing or large-scale multi-point shaft operation status monitoring with high spatial resolution such as that associated with steam turbine high pressure (HP), intermediate pressure (IP), and low pressure (LP) stages.

The use of the multi-wavelength light beams in the system enables more reliable shaft status monitoring by differentiating the sensing signals from different wavelengths simultaneously wherever hydrocarbon oil, dirty, or corrosive surfaces could be potential problems. This is because a specific wavelength may be strongly absorbed by these contaminants that can cause low or even lost signals, while other wavelengths may have only slight absorption so that the differential of two slightly absorbed beams can provide a reliable method of measuring a parameter in a harsh environment.

The time delay from an optical encoding mechanism (e.g., shaft encoded reflective strips) 38 and FFT-based cross-correlation and filtering of sensor signals via the signal processor 36 to recover the noise-suppressed envelope and carrier of cross-correlation function provides both static and dynamic real-time torque online analysis and monitoring technology. According to one embodiment, shaft surface encoded reflective strips with a series of evenly spaced lines, create periodically gated DC+ carrier signals from each reflectance probe. According to another embodiment, shaft surface encoded reflective strip with a series of chirped, or unequal, spaced lines, create a continuous chirped carrier signal from each reflectance probe signal. Such an encoded signal pattern provides unique reflectance signatures for both static and dynamic sensing parameters such as torque and torsional vibration modes.

The FFT-based cross-correlation and filtering of reflectance signals to recover the noise-suppressed envelope and carrier of the cross-correlation function advantageously resolves any potential light beam reflectance variation induced sensing accuracy degradation. This is achieved by first deriving a gross shift from the envelope and then a refined shift (within half of carrier period) from any carrier phase shift to determine angular displacement associated mechanical deformation and shaft surface twist or angular displacement. This technique not only provide a static and dynamic torque status monitoring, but also advantageously provides a direct method to simultaneously measure a rotor's torsional or flexural vibration from time delayed signal FFT analysis.

Figure 3:
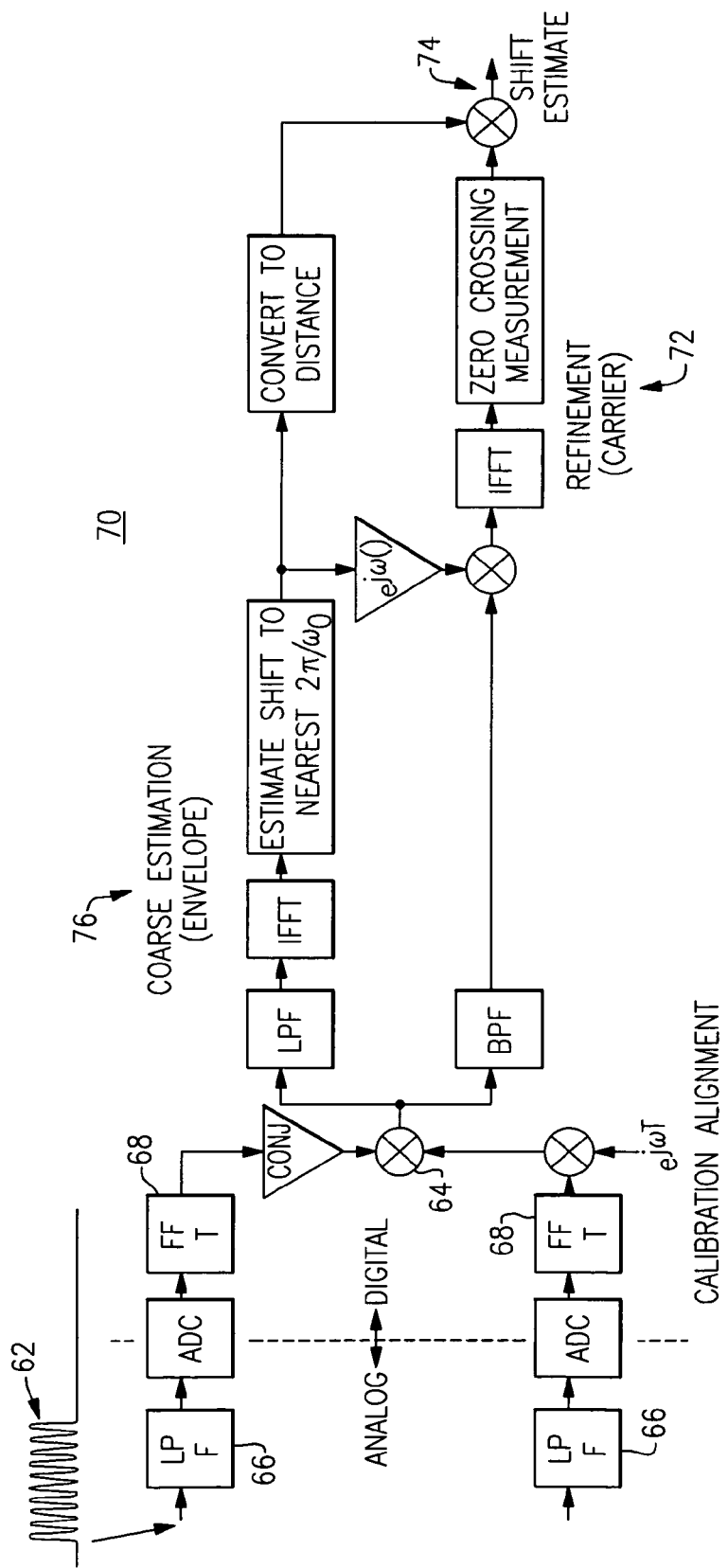
FIG. 3 is a diagram illustrating a signal encoding and processing scheme for a fiber-optic torque sensor according to one embodiment of the invention.

FIG. 3 is a diagram illustrating a signal encoding and processing scheme 70 suitable for use with fiber-optic sensing system 10 according to one embodiment of the invention. Together, the phase shift torque detection technology described above and the FFT-based signal processing method and system 70 can be used for simultaneous rotor static and dynamic torque detection with self-calibration capability, regardless of the environmental temperature variations and shaft surface imperfections due to corrosion and erosion, among other things.

Further, the reflectance signal signature, rather than absolute reflected light intensity, analysis technology described above and the FFT-based signal processing method and scheme 70 can provide digitized angle displacement-based responses to a sensing parameter that is much more reliable than conventional intensity or reflectance based analog detection technologies. The multi-furcated fiber splitter 22 and co-axial torque-sensing probes 26, 28, 30, 32 described above provide a system that eliminates the need for optical alignment, greatly improving the system availability and reducing system maintenance requirements.

Signal encoding and processing scheme 70 creates periodically gated DC+ carrier signals or aperiodic chirped DC+ carrier signals based on the reflected pulsed light (i.e. laser or LED) signals emanating from the turbomachine shaft reflective strips 38 that are encoded according to one embodiment with a series of evenly or chirped spaced lines for torque and torsional vibration information encoding. The optical encoding mechanisms 38 according to one embodiment are associated with a v-groove or metal bar code embedded at desired locations on the shaft surface 24 that reflect the incident light (i.e. laser or LED) signal, as described above.

The surface of the turbomachine shaft 24 can itself be modified by changing, without limitation, the surface texture to provide areas having different depths relative to other areas of the shaft surface. The optical encoding mechanism 38 can be implemented, for example, by forming a v-groove through the surface of the shaft at desired locations such that a corresponding time delay can be detected from any two v-groove locations to determine shaft twist angle value that can be used to determine the shaft torque.

The optical encoding mechanism applied onto or into the shaft of the turbomachine can also be implemented, without limitation, via attaching or otherwise creating a periodic or aperiodic chirped pattern or single straight-line pattern onto or into the surface of the shaft at desired locations such that the corresponding time delay can be detected.

FFT-based 68 cross-correlation 64 and filtering 66 of sensor signals 62 function to recover a noise-suppressed envelope and carrier of the cross-correlation function for signal processing. A course estimation (gross shift) 76 is derived from the noise-suppressed envelope, while a refined shift (within one-half of carrier period) 72 is derived from the carrier phase shift to provide a high accuracy phase shift estimate 74 that can then be used to support an accurate determination of the desired shaft twist and vibration information.

Light is then applied to the surface of the shaft 24 via a multi-furcated optic fiberoptic splitter 22. The light source can be, without limitation, an LED light source, a laser light source, or a broadband light source such as a white light source, or a multi-chromatic light source that is robust to shaft contamination and so forth as described in more detail herein. A pristine or perfect shaft will require only one wavelength of light to provide a system and method according to the principles described herein.

According to one embodiment, the fiber-optic splitter 22 is a fiber bundle that receives light from a light source 12 such as described above, and branches (splits) off into separate optic fibers to specific areas of the turbomachine shaft surface 24. Each leg of the split will be associated with a light amplitude that is different from that associated with other legs of the split due to the relative differences in distance between legs the light must travel. The wavelength however, will be the same for each leg such that the light signature remains constant at the ends of the legs. Transmission of multiple wavelengths of light via the fiber optic interconnect can occur simultaneously in accordance with the principles described herein. A fiber optic interconnect according to one embodiment is described in more detail below with reference to FIG. 7. Such an optical device comprises a plurality of multimode fibers, configured either in a random, half-and-half, regular, or coaxial patterns. These fibers are bonded together by high-temperature ceramic adhesive, and sealed by metal material, such as stainless steel (working range up to 1500° F.).

Each leg of the fiber optic interconnect is coupled to a reflectance probe 26, 28, 30, 32 that has an incident/transmission leg and a sensing/measurement leg. The incident leg applies/transmits incident light to the surface of the shaft, while the measurement leg senses modified light that is reflected by the shaft surface in response to the incident light. Each reflectance probe is placed in close proximity to the surface of the shaft. One embodiment of a reflectance probe is described in more detail below with reference to FIG. 8. The 1×2 fiber bundle based reflectance probe comprises a plurality of multimode fibers, configured either in a random, half-and-half, regular, or coaxial patterns. These fibers (working range up to 2000° F.) are bonded together by high-temperature metallic adhesive (working range up to 2000° F.), and sealed by anti-oxidazation metal material, such as Inconel 625 (working range up to 2100° F.).

The reflectance probe measurement leg is coupled to a photosensitive detecting mechanism such as a photosensor array 34, or a CCD or CMOS. The reflectance pattern of the reflected light at the wavelength(s) of interest is measured via the photodetecting mechanism, which generates the signal(s) of interest.

Signal processing commences by first calibrating out any differences between reflected signals received from different locations along the turbomachine shaft so that no measurable differences exist between measured signals carried by the fibers while the shaft is stationary. Anything that can contribute to torque measurement error is therefore backed out of the torque calculation.

Keeping the foregoing structure and principles in mind, any applied torque will cause a twist in the turbomachine shaft that will cause the initial alignment between reflectance probes to change. Any change in reflectance signatures between the fiber reflectance probes are measured to retrieve signal information that can be used to determine a respective change in shaft twist (twist value) and its dynamic variation due to static and dynamic torques. The desired shaft torque and torsional vibration information (torque value) is determined from the twist value and its time dependence.

The torque value can be determined by one of two techniques. The first technique is via calibration using accepted gold standard torque sensors that relate the measured value of twist to an absolute value of torque using a look-up table. The second technique is via an analytical approach using formulas to calculate torque based on the measured value of twist, and is dependent upon shaft characteristics such as geometry, materials elastic modulus, etc. Such formulas and transfer function are embedded into the signal processing software.

The use of fiber optic based instrumentation described herein advantageously avoids the need for special lenses, prisms, diffraction gratings, and other like tools of the trade when dealing with free space optics, to avoid alignment issues, issues dealing with changing temperatures that impact focal length, focal length, and so on. The use of fiber optic mechanisms described herein also mitigates issues dealing with temperature dependent mechanical properties of optical lens holders, stages and metal parts.

Determining torque values based upon phase measurements alone can result in ambiguities among the measured signals. These ambiguities can be mitigated according to one embodiment by performing optical encoded reflectance signature signal processing techniques such as described above with reference to FIG. 3.

The use of fiber optics and distributed sensing techniques such as described herein advantageously allows use of one set of instrumentation to eliminate the need for individual detectors. The use of a broadband light source having multiple wavelengths can be employed to implement a multi-parameter sensing system that can penetrate different types of shaft contamination that can occur over time in accordance with embodiments of the invention described above. Further, the use of multifurcated fiber bundles as described herein provides a robust sensing system that is impervious to, without limitation, high temperatures, humidities and chemical vapors such as those associated with the breakdown of free space optics system that can cause fowling and defocusing of lenses.

Figure 4:
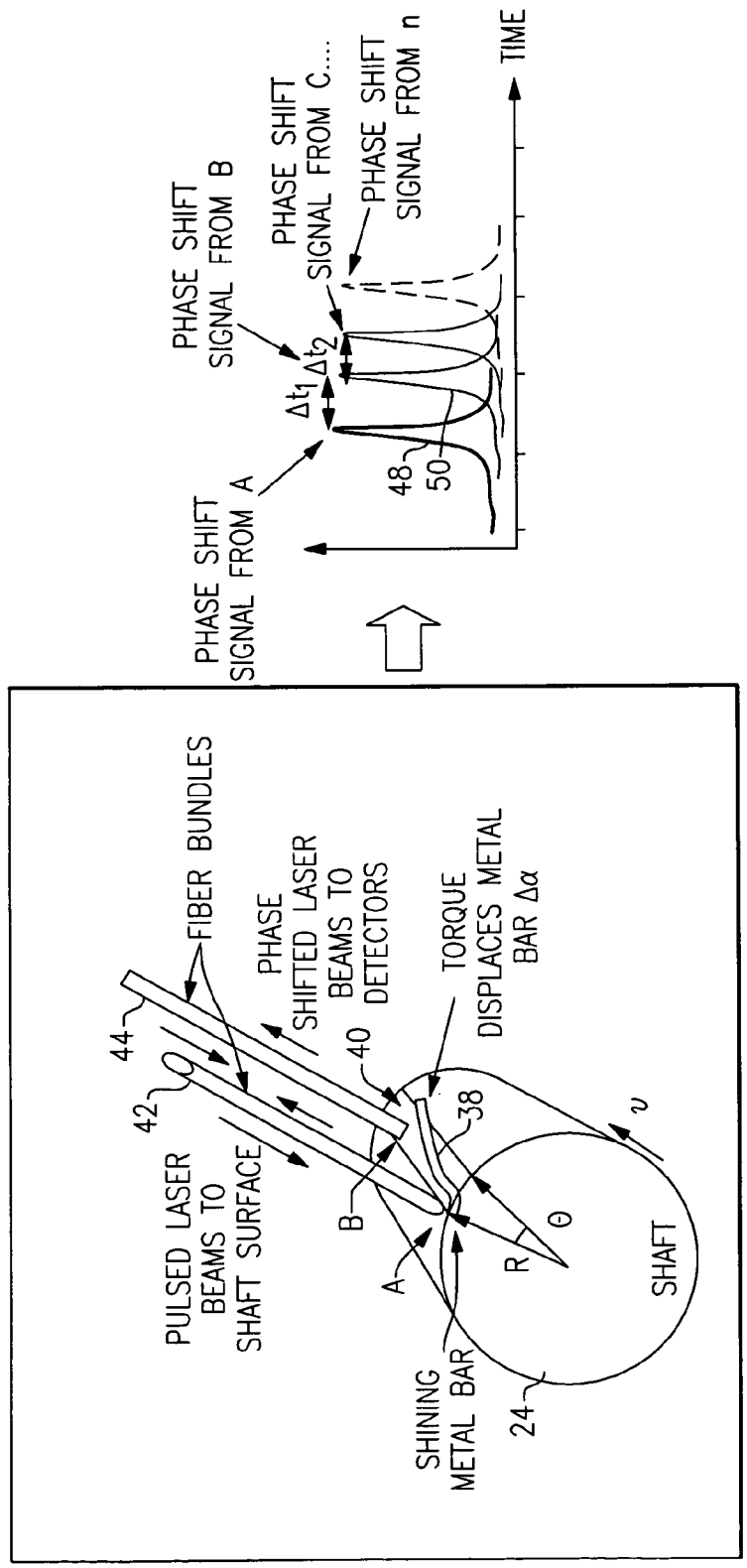
FIG. 4 is a simplified diagram illustrating a technique for determining a torque measurement based on multi-point differential phase shifts according to one embodiment of the invention.

FIG. 4 is a simplified diagram illustrating a technique for determining a torque measurement based on multi-point differential phase shifts according to one embodiment of the invention. The surface of a turbomachine shaft 24 includes one or more encoded reflective strips 38 with a series of evenly spaced lines according to one aspect of the invention. A torque applied to the turbomachine shaft 24 causes the shaft to twist resulting in an angular displacement 40 of the shaft 24.

Multifurcated fiber bundles 42, 44 provide a transmission medium for transmitting pulsed laser beams to the shaft surface 24 and for receiving the reflected signals there from. The reflected signals are received by photosensitive detectors 34 such as depicted in FIG. 2. The phase shift between two reflection probes can be determined by their time difference from their maximum reflectance peak position in time domain.

A baseline or initial time signal 48 is measured based on a pulsed laser beam via optic fiber 42. Another time-delayed signal 50 is measured based on the pulsed laser beam via optic fiber 44. More specifically, a torque displacement 40 is determined based on a time delay difference between the received reflected signals in response to the transmitted pulsed laser beams to the encoded shaft surface 14, 16, 18, 20 etc.

The torque displacement 40 of the reflective strip(s) 38 can be represented as Torque displacement $\alpha = \Delta t \times v$, where $\Delta t$ is time difference and $v$ is shaft rotation angular velocity. The actual phase shift can be represented as Phase shift $\theta = \alpha/R$, where $\theta$ is the angular displacement of the reflective strip(s) 38, and R is corresponding radius of the shaft.

Because multi-points are measured on the shaft surface 24, all of the detected signals can be electronically gated by time to obtain all of the phase shifts that correspond to torque at different locations.

Figure 5:
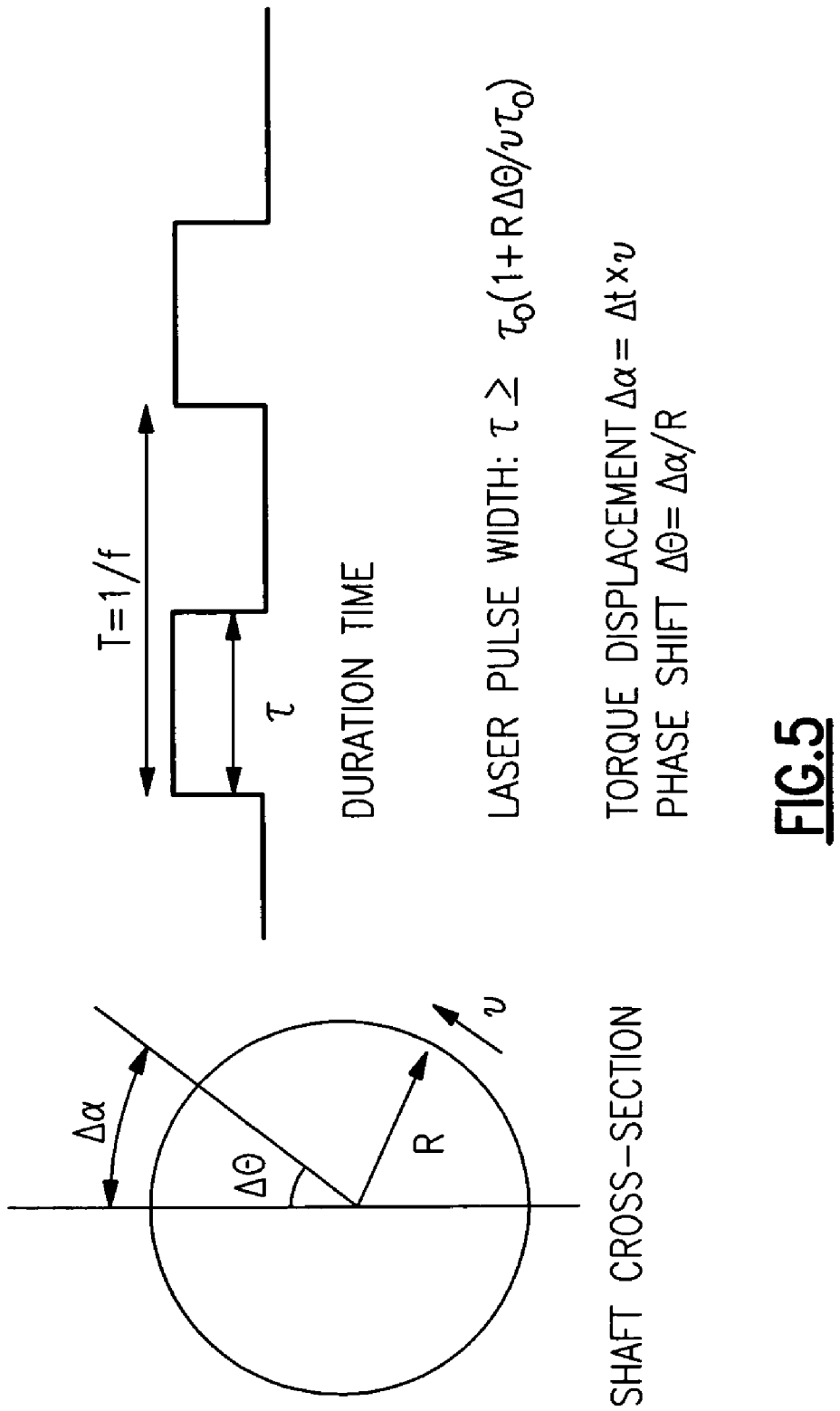
FIG. 5 is a diagram illustrating a pulsed light source width condition for torque sensing according to one embodiment of the invention.

FIG. 5 is a diagram illustrating a pulsed light source width condition for torque sensing according to one embodiment of the invention. It can be seen the duration time $\tau$ of the applied light source plays a role in determination of the torque displacement $\alpha$. In practice, a continuous light source also can be used for torque detection where the time delay is obtained by differentiating the time-domain reflectance signal signatures from two spatial separated reflectance probe signals. In a simple situation, such a signature corresponds to the maximum reflection peak when the reflected signal has a single-peak like profile. In another situation, such a signature corresponds to single or multiple sub-peaks from a wave package envelope that originates from periodic or aperiodic optical encoding mechanism. However, the use of the pulsed light source is more suitable for rusted or dirty contaminated shaft surface to avoid spurious signals from irregular shaft surfaces, and thereby provides a more reliable method for turbomachinery system fault event diagnostics and prognostics.

Simultaneous time delay and rotor torsional vibration detection provide both static and dynamic torque sensing with a single fiberoptic torque sensing system as described above. This combination of two sensed responses provides a novel solution that overcomes problems associated with current stationary proximity, strain gages, magnetostrictive, and magnetoelastic sensors, including without limitation, baseline drift and necessity for frequent recalibration.

Figure 6:
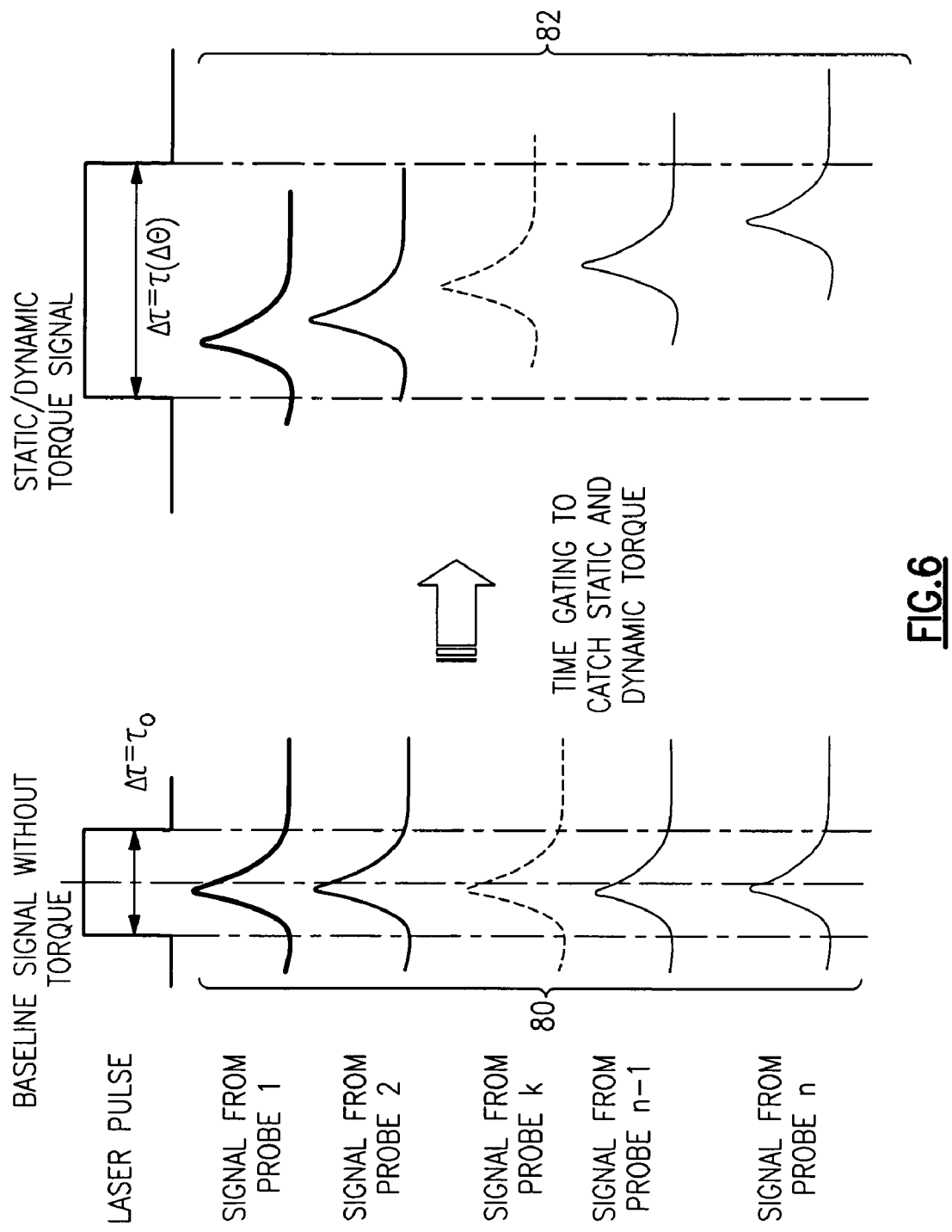
FIG. 6 is a diagram illustrating baseline signals, and static and dynamic torque signals measured by varying input light source pulse width according to one embodiment of the invention.

FIG. 6 is a diagram illustrating a set of baseline signals 80 from multiple fiber bundle reflectance probes, as well as static and dynamic torque induced time delay signals 82 measured by varying an input light source pulse width such as depicted in FIG. 5, according to one embodiment of the invention. Gating of the light source is timed to catch both static and dynamic torque signals.

Figure 7:
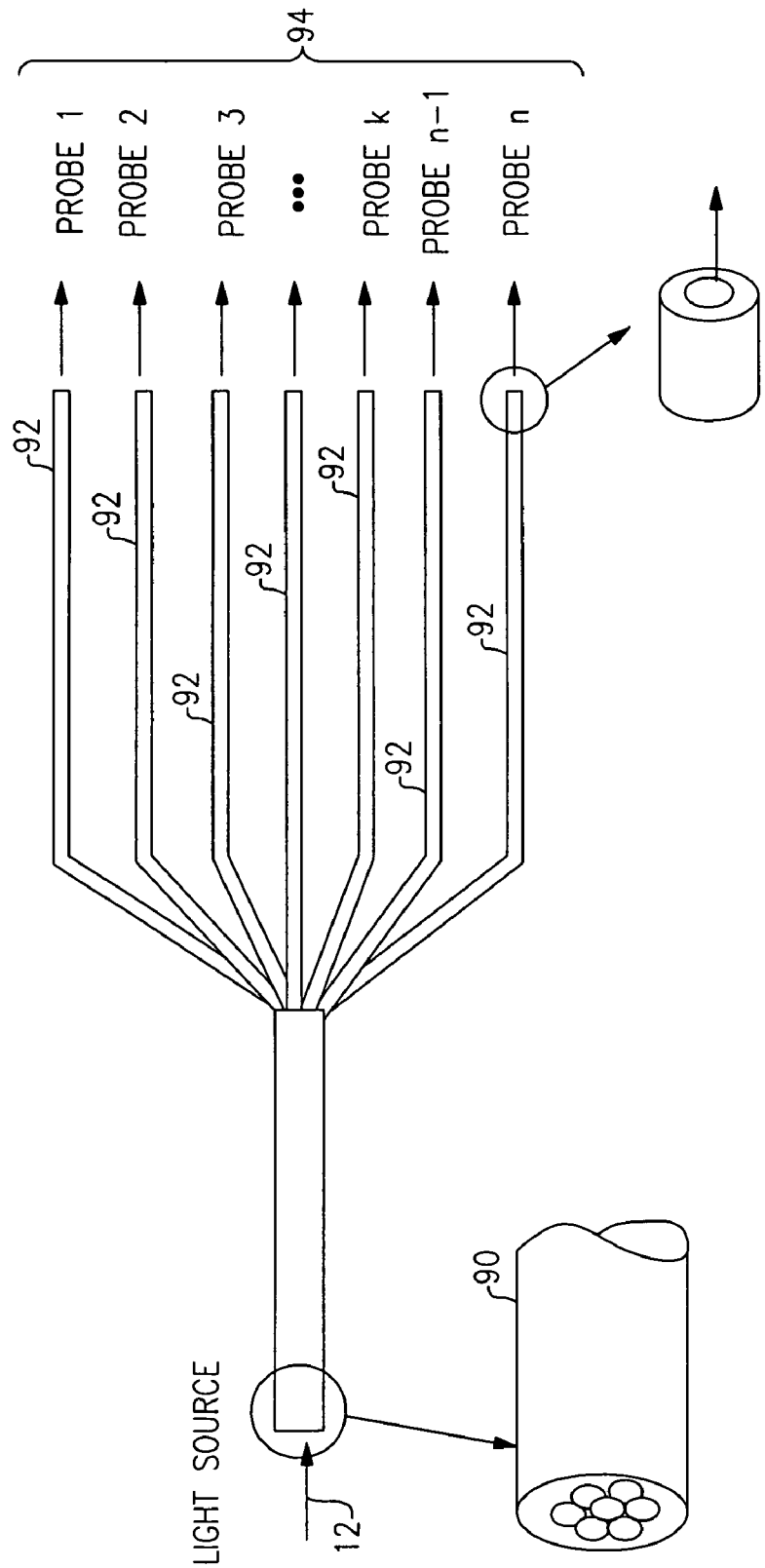
FIG. 7 is a diagram illustrating a multi-furcated fiber bundle for delivering a light source to multi-reflective probes according to one embodiment of the invention.

FIG. 7 is a diagram illustrating a multi-furcated fiber bundle based splitter 90 or 22 in FIG. 2 for delivering a light source 12 to multiple reflectance probes according to one embodiment of the invention. Here the splitted optical fibers 92 can be deployed as an array; and hence a single laser light source 12 can be split into many individual transmission probes 94 rendering higher spatial resolution of measurement. Sensing system 10 is therefore suitable for applications that require multi-point and multi-parameter to be monitored with high spatial resolution such as steam turbine HP, IP and LP stages or a whole turbomachinery system.

Looking again at FIG. 2, fiberoptic-sensing system 10 employs differential simultaneous multi-parameter sensing with either three separate and distinct wavelengths of laser light or broadband light-emitting diode. The fiberoptic sensing system 10 can be employed in real-time turbomachinery system applications including without limitations, steam turbine, rotor shaft mechanical deformation status (static and dynamic torque, rotor flexural vibration, etc.) monitoring and control to improve power generation efficiency. The fiberoptic sensing system 10 is more robust and reliable for rotating system operation status or condition sensing applications than known temperature sensitive stationary proximity, magnetostrictive and magnetoelastic sensors. The fiberoptic sensing system 10, for example, can operate at temperatures about 1200° F. higher than many known conventional torque sensing devices and systems because the sensing probe, i.e., fibers plus package, can sustain high-temperature operation.

Figure 8:
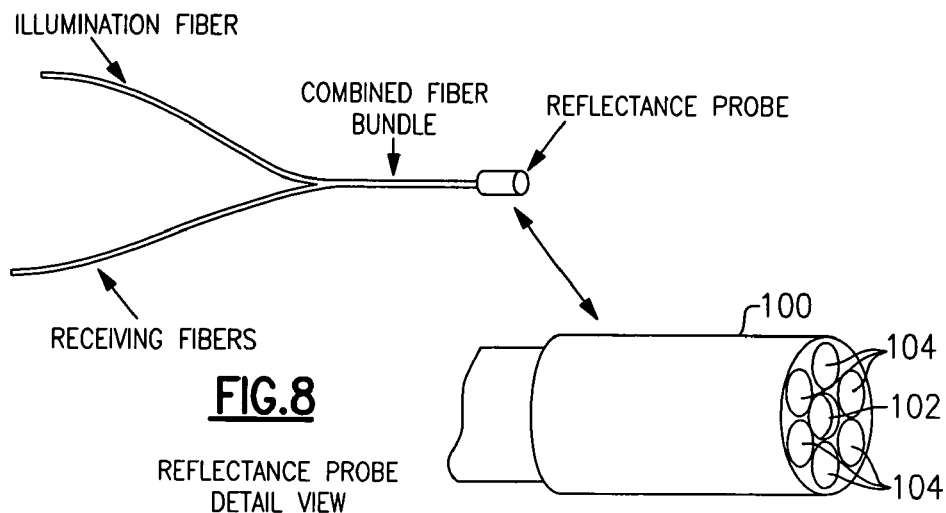
FIG. 8 is a diagram illustrating a reflective probe with a 6×1 fiber configuration for light delivering and receiving from the shaft surface according to one embodiment of the invention.

FIG. 8 is a diagram illustrating a 1×2 reflectance probe 100 with a 6×1 fiber configuration for light delivering and reflectance receiving from the shaft surface 24 according to one embodiment of the invention and that is suitable for use with fiberoptic sensing system 10 to implement the high-temperature fiber bundle-based reflectance sensing probes 26, 28, 30 and 32 depicted in FIG. 2, in contrast to fiber Bragg grating or long period grating structures, making the system 10 ideal for detecting static and/or dynamic parameters. The central fiber 102 is used for laser beam delivery that is from optical splitter, and six co-axial fibers 104 are used to pickup the scattering signal from the rotor encoded shaft surface 24 to one element of an array of photosensitive detection 34. The single bifurcated co-axial 6×1 fiber bundle structure advantageously replaces an accelerometer as a rotor flexural vibration sensing probe to provide simultaneous torque and torsional and flexural vibration modes detection with a single sensing instrument. The bifurcated co-axial 6×1 fiber bundle structure advantageously effectively resolves multiplexing requirements at a significantly reduced system cost when compared with conventional torque sensing systems.

A reflectance detection probe 100 may be configured in one of many fiber configurations, such as random, half-half, co-axial, and others, for delivering light and receiving reflected light from the shaft surface 24 according to one embodiment of the invention. Such a reflectance detection probe 100 provides a solution for steam turbine LP, IP and HP stage static and/or dynamic torque detection, as well as for torsional and flexural vibration detection. Such a reflectance detection probe 100 is well suited for turbomachinery system multi-parameter and multi-location operation status diagnostics and prognostics.

The multi-wavelength light source and phase shift based reflectance-sensing methods and systems described herein are not dependent upon rotor shaft absolute surface reflectance and scattering efficiency. These methods and systems are instead based on encoded reflectance signatures, contrast induced signal rising time delay(s), and phase shifts, as well as on frequency signatures. These signature patterns recognition and differentiations greatly mitigate shaft surface imperfections including without limitation, corrosion/erosion, oil and water induced reflectance fluctuation that cannot be achieved using known torque sensing methods and systems. Further, the high-temperature packaged fiber bundle reflectance probe structures described herein tolerate steam turbine internal temperature fluctuations that otherwise affects torque sensing accuracy since the thermal radiation induced reflectance fluctuation is negligible when T<1200° F.

The high-temperature packaged fiber bundle probe structures described herein also can employ random, half-half and co-axial fiber arrangements to allow shaft clearances from about 1 mm to about 10 mm to provide maximum flexibility and tolerance and mitigate rotor flexural vibration and thermal expansion as well as temperature and pressure dependent shaft mechanical deformation. The fiber core in each fiber bundle, according to one embodiment, has a diameter ranging from 50 micrometer in diameter to a few hundred micrometers in diameter either with a Ni, Ti, or Au metalized surface for T>1000° F. applications, or polyimide for T<800° F. applications. These fibers are bonded together and sealed in a metal ferrule by a 2000° F. metallic adhesive.

Figure 9:
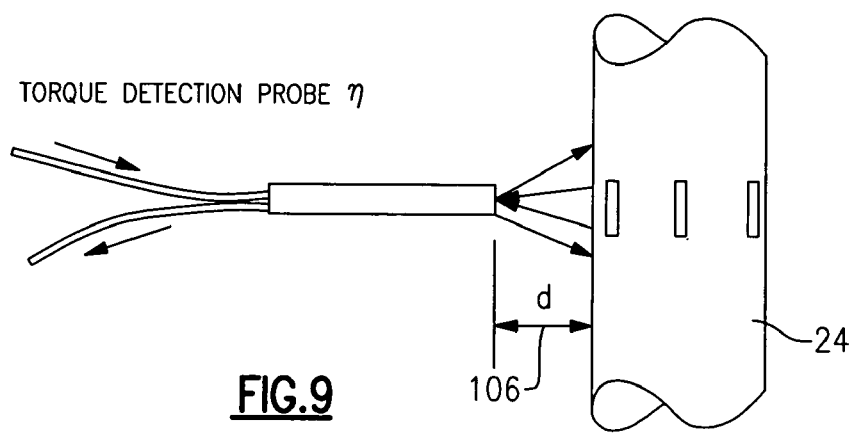
FIG. 9 illustrates the configuration of a torque detection probe distance from the shaft surface and its corresponding operation working points according to one embodiment of the invention.

FIG. 9 illustrates the signal detection from a reflectance detection probe 104 with a distance of d 106 from the shaft surface 24 and its corresponding operation working points either at 108 or at 110 according to one embodiment of the invention. The reflectance probe can be installed at two typical distances from the shaft surface, the first operation working distance 108 provides a high sensitivity via a short distance, while the second operation working distance 110 allows the sensing probe to be positioned further from the shaft surface. These working distances render the detection of fluctuating dynamic displacement of the shaft flexural vibration, thermal expansion, and nonlinear fault events.

FIG. 10 illustrates reflectance levels at different operation working points for the torque detection probe shown in FIG. 9.

Figure 11:
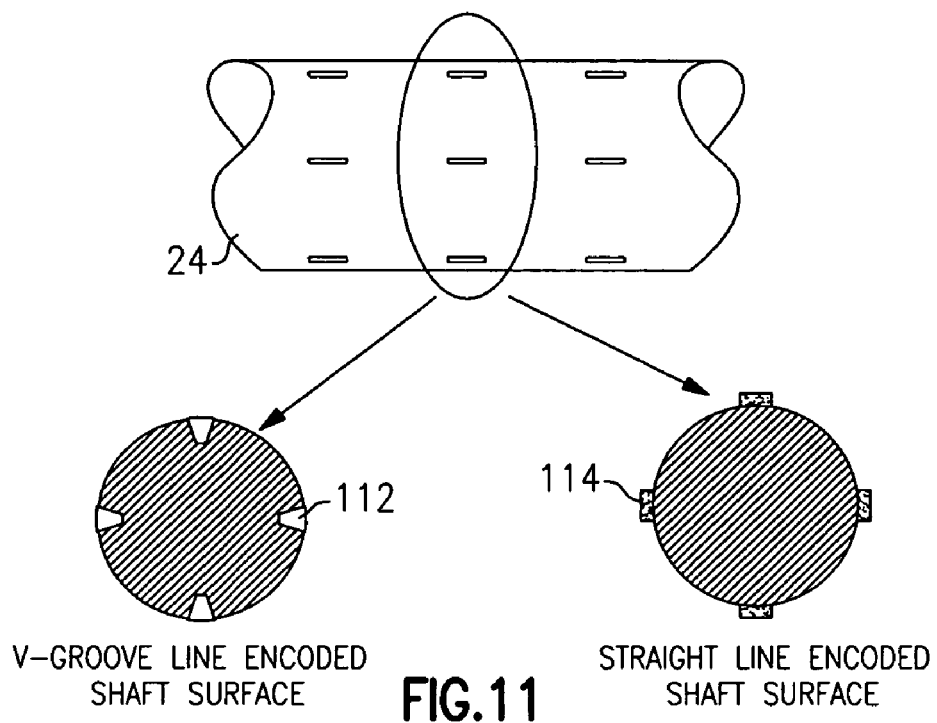
FIG. 11 illustrates shaft surface encoding methods including v-groove lines and straight lines according to particular embodiments of the invention.

FIG. 11 illustrates shaft surface 24 every 90° encoding methods including v-groove lines 112 and straight lines 114 according to particular embodiments of the invention, and that are suitable to implement the optical encoding 38 depicted in FIG. 2. These encoders can be distributed along the shaft circumference in every certain angles from 360°, 180°, 90°, 60°, 30° etc.

FIG. 12 further details three shaft surface encoding patterns 120, 122, 124, suitable to implement the v-groove lines 112 and straight lines 114 shown in FIG. 11. The v-groove can be made from a laser micromachining process or laser marking directly onto the shaft surface; other two methods can be also based on laser micromachining or marking process produced either single-straight line or periodic and aperiodic chirped straight lines onto a sheet of CrMoV steel for HP/IP section, and NiCrMoV steel for LP section. In the area of couplings for section torque measurements, a shaft diameter is typical from 10" to 30" in diameter. The required encoding sheet size could be of (length) 10 mm×(width) 5 mm×(thickness) 0.1 mm where the thickness selection of the metal sheet should produce significant reflectance signal signature variation.

FIG. 13 illustrates torque-sensing signals from different encoding patterns including sensing signals 130 from a periodic or chirped straight lines encoded shaft surface and sensing signals 132 from a v-groove encoded shaft surface, both within one cycle at a rear operation working point 110 in FIG. 10. In the frequency-domain, the natural frequency of a shaft rotation should be 30-60 Hz for a 1800-3600 rpm rotating system. For optical encoding from each quarter section, four encoding marks normally have constant time delays among them. The static torque, transient torque, and vibrations could make these time delays vary with time and depend upon real-time turbomachinery system operation conditions.

FIG. 14 illustrates time-delayed signals 130 associated with different reflectance probes in response to a periodic or chirped straight-line encoded shaft surface within one cycle for static and dynamic torque detection.

FIG. 15 illustrates static and dynamic torque signals 132 associated with different probes in response to a v-groove line encoded shaft surface within one cycle.

FIG. 16 is graphical representation of dynamic torque detection signal 134 based upon a time delay between a first probe and a k-th probe as a function of the time from FIGS. 14 and 15, according to one embodiment of the invention. Here the average signal represents a static torque value.

FIG. 17 is a graphical representation of the reflective signal 140 from a periodic or chirped straight lines encoded shaft surface 142 according to one embodiment of the invention. The measured reflectance signal 140 from a periodic straight lines demonstrated how the reflectance signal signature is periodically modulated by the optical encoding method. For static torque sensing in which the shaft is loaded, encoding with chirped straight lines is preferred.

FIG. 18 is graphical representation of the measured torque and corresponding twist angle according to one embodiment of the invention. The principles described above with reference to FIG. 1-18 can also be applied as described below with reference to FIGS. 19-24, to monitor flexural and torsional (both linear and non-linear) vibrations of turbine-generator shafts that can produce transient oscillations that exceed the steady state stress levels under full load conditions.

The turbomachinery system fiberoptic multi-parameter sensing instrumentation described in further detail below is useful to monitor flexural and torsional vibrations of rotors and shafts at different sections that can produce transient oscillations that exceed the steady state stress levels under full load conditions, as stated above. Such transient nonlinear vibrational events can induce wear of bearings, bending deformation of shafts and high torque loading, and threatens the stability of a steam turbine power generation system, among others. Conventional vibration sensing technology such as accelerometers, strain gages, proximity probes and tachometers may be limited either by steam turbine harsh environment conditions including without limitation, temperature, pressure, steam or moisture and high flow rate, or by their nature as contact and electrical sensing devices. The fiberoptic-based torque and vibration sensing system embodiments described below with reference to FIGS. 18-23 are directed to fault diagnostics and prognostics for a turbomachinery system that are advantageously both thermally-insensitive and immune to electromagnetic interference.

FIG. 19 illustrates one portion of a fiberoptic vibration monitoring system 210 for a steam turbine 212 according to one embodiment of the invention. The sensing mechanism is implemented via multi-furcated fiber bundles 214 that transmit multi-wavelength light, e.g., laser beams, to an optical encoded shaft surface 216 and also receive dynamic reflectance signals from the shaft surface 216 to a high-speed photodetector array 218. The incident light source is periodically modulated; and the received dynamic reflectance signals from the optical encoded shaft surface 216 are detected by the high-speed photodetector array 218. The detected reflectance signals are analyzed by a multi-channel data acquisition system according to one embodiment of the invention.

Both flexural and torsional vibrations are obtained based on spectral analysis of the dynamic reflectance signals using fast Fourier transform methods in response to fundamental shaft rotating natural frequencies to higher-order harmonic components. More specifically, the transient torsional modes that correspond to strain cycles at relatively high amplitudes can be identified by instantaneous high-frequency oscillations discussed in further detail below.

The vibration sensing methods and instrumentation described herein can just as easily be used for measuring transient nonlinear shaft torque dynamics, such as described above, and that may be associated with transmission line fault events. Features of the vibration sensing techniques described herein relate to elimination of any contact requirements and insensitivity to moisture, pressure, and fuel/gas flow dynamics. Other features include, without limitation, simultaneous detection of both vibration characteristics and associated nonlinear effects related to a turbomachinery system fault diagnostics and prognostics.

A substantial advantage provided by the vibration system techniques and topologies described herein relate to the distribution of multiple sensing probes in a turbomachinery system that can operate at temperatures up to about 1200° F.

Although particular embodiments are described herein for systems and methods of implementing vibration detection, an optical encoded shaft surface such as described above for static and dynamic torque sensing may be unnecessary to detect flexural vibration characteristics, although necessary to detect torsional vibration characteristics. This is because the sensing signal for vibration is analyzed in the frequency-domain by observing the shaft fundamental frequency mode to high-order harmonic components, as stated above.

FIG. 20 illustrates a technique for transmitting laser light signals 220 via an optic fiber bundle 226 and receiving multiple reflective signals 224 in response thereto, according to one embodiment of the invention. The devices and mechanisms depicted in FIG. 20 form a multi-point, non-intrusive, flexural/torsional vibration online monitoring and diagnostic system that can detect a vibrational frequency range from fundamental shaft rotating natural frequencies to higher-order harmonic components, which are a common fault form from a steam turbine-generator shaft. The resultant system provides a dynamic torque signal analysis by fast Fourier transform (FFT) techniques from measured dynamic reflectance from an optical encoded shaft surface such as described above. The sensing device comprises multi-furcated fiber bundles based optical splitter 226 that transmit multi-wavelength laser beams to the shaft surface and reflectance detection probes 228 receive dynamic reflectance signals from the shaft surface to a photodetector array 230, according to one embodiment. The incident laser beams are periodically modulated from continuous wave to kHz-squared wave; and the received dynamic reflectance signals are detected by a high-speed photodetector array 230. The detected signals are then analyzed by a multi-channel data acquisition system according to one embodiment.

Under normal shaft operating conditions that correspond to the stable equilibrium status, the observed low-frequency random vibration signal, although small, could be the result of the rubbing motion between rotor and stator, distortion of shafts, slippage of couplings and other random forces. Flexural vibration modes are caused mainly from a rotating system mechanical misalignment, unbalance, temperature distribution and pre-bending; while the torsional vibration may be due to shaft loading condition variation-induced torque dynamics and transient rotating speed variations. External unknown excitation forces, transient power switching and unstable global system operation can also induce transient nonlinear vibration modes that could have high vibration amplitudes.

FIG. 21 illustrates dynamic reflectance based flexural vibration signal detection principles according to one embodiment of the invention. An encoded shaft surface such as discussed above is not required for measurement of random and flexural vibrations since a frequency-domain spectral analysis from the dynamic reflectance can itself be used to determine normal loading condition status, as stated above.

FIG. 22 illustrates a multi-point dynamic reflectance based torsional vibration signal detection technique according to one embodiment of the invention. The transient torsional vibration that is associated with dynamic shaft torque desirably employs an encoded shaft surface such as described above, according to one embodiment of the invention. The dynamic torque is determined by a phase shift of the time-domain encoding signature, while the torsional vibration will induce frequency-domain high-frequency harmonic components which are an integral of the fundamental natural frequency of the shaft vibration such as depicted in FIG. 23 that illustrates a multi-point dynamic reflectance based torsional vibration time-domain signal according to one embodiment of the invention; and in FIG. 24 that illustrates a multi-point dynamic reflectance based torsional vibration spectrum from a probe according to one embodiment of the invention. The high bandwidth achievable using the herein described frequency-domain vibration sensing techniques allows the foregoing vibration modes to be simultaneously identified by both power and phase spectra.

The vibration-sensing principles described herein can be implemented to provide simultaneous monitoring of both constant and transient flexural and torsional vibration events from a shaft rotating fundamental natural frequency to higher-order harmonic components, as stated above. More specifically, the transient nonlinear torsional modes that correspond to strain cycles at relatively high amplitudes can be identified by instantaneous and short period to time high-frequency oscillations that can be used for transient transmission line fault event identification. Such an automated monitoring technique can be employed, for example, in different pressure stages of a steam turbine, including without limitation, multi-rotor or shafts at power-generation facilities where the shaft failure can be induced by transient and nonlinear flexural and torsional vibration.

The multi-parameter fiber bundle based multiplexing torsional vibration detection principles described herein, although useful for rotor or shaft fault diagnostics, are also useful for simultaneous measurement of thermal induced shaft mechanical deformation and transient shaft rotation speed variation, as well as transient nonlinear vibration characteristics.

Advantages provided by a vibration-sensing system having features described herein include without limitation:

1) the fiberoptic based turbomachinery system shaft vibration status monitoring system is immune to electromagnetic interference;

2) the system can be deployed in a harsh environment affected by temperature, pressure, moisture, etc.;

3) the system provides multiple vibration modes (transverse, flexural and torsional) simultaneously by sensing dynamic reflectance either from an optical encoded shaft surface or from a bare shaft surface;

4) the system has no moving parts and also has no optical alignment requirement;

5) the system detects dynamic reflectance signals from a shaft surface by fiber bundle-based optical splitter(s) such as 1×2, 1×4 and 1×8 optical splitter(s)that allows multi-point simultaneous vibration event sensing with a single instrument;

6) the fiberoptic sensing system employs a reflectance sensing probe constructed with a high temperature, low thermal expansion, anti-oxidization metal (i.e. Kovar, Invar, Inconel or Incoloy, etc.) ferrule; high temperature metallic adhesive as a bonding material; a single fiber for the incident light (i.e. laser) beam delivery, and multiple (i.e. 6) fibers with a hexagonal configuration for dynamic reflectance signal receiving according to one embodiment;

7) a system configured such that the received reflectance signal can be delivered to a photodetector array by an optical reflectance probe (i.e. 1×2, 1×4 or 1×8 optical combiner) that is packaged in an interlock BX stainless steel sheathed cable according to one embodiment;

8) use of a sensing probe that is insensitive to temperature since the reflectance transmitted by the optical fiber is limited to a narrow spectral range with a high cut-off wavelength less than 2 um making it insensitive to long-wavelength radiation; and also the thermal radiation induced reflectance fluctuation is negligible when T<1200° F.;

9) use of a sensing probe surface coated with a hydrophobic high temperature alumina-based ceramic thin film according to one embodiment, making the dynamic reflectance signal amplitude moisture insensitive;

10) use of fiberoptic sensing probes deployed as an array, allowing a single light source to be split into many individual sensing probes rendering higher spatial resolution of measurement that is ideal for multi-point sensing applications such as for steam turbine shaft vibration status monitoring from high-pressure to low-pressure stages;

11) use of a multi-wavelength light source to enable dynamic reflectance sensing insensitive to ptical absorption from moisture, hydrocarbon oil and dirt by differentiating reflectance measurements from different wavelength simultaneously;

12) use of a sensing signal process that includes a filtering technology that can recover a noise-suppressed envelope and carrier to provide a cross-correlation function for providing both static and dynamic real-time vibration status online analysis and monitoring;

13) use of a predictive diagnostic and prognostic method based on nonlinear transient vibration analysis; and 14) use of a practical monitoring method for turbomachinery bearing, rotor and shaft alignment identification by observing nonlinear vibration amplitudes and modes simultaneously.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of sensing turbomachinery system shaft static and dynamic torques, vibration modes and associated operation status, the method comprising:

transmitting light from a single light source to a plurality of shaft surface locations on a turbomachinery system via a plurality of optical fiber bundles, the plurality of shaft surface locations arranged in a substantially axial direction between the ends of at least one shaft, such that a plurality of dynamic reflected light signals are received from the plurality of shaft surface locations by at least one high-temperature fiber bundle-based lensless reflectance sensing probe while at least one shaft is rotating, wherein at least one of the plurality of shaft surface locations has an altered texture defined by a v-groove inscribed into the surface of the shaft by altering the surface depth of desired shaft surface areas relative to other shaft surface areas and at least one other of the plurality of shaft surface locations does not include an altered texture, wherein the depth of the v-groove provides a front working point signal and a rear working point signal such that a corresponding time delay can be detected from any two v-groove locations to determine the shaft twist angle value by differentiating their reflectance pattern signatures during each rotating cycle; and determining at least one turbomachinery system shaft torque characteristic based on at least one characteristic of the dynamic reflected light signals received from the at least one of the shaft surface locations; and determining at least one turbomachinery system shaft vibration characteristic based on at least one characteristic of the dynamic reflected light signals received from the at least one other of the surface locations.

2. The method according to claim 1, wherein each optical fiber is multi-furcated such that light is transmitted to each turbomachinery shaft surface location via one leg of a multi-furcated optic fiber splitter and further such that light received from each shaft surface location in response to the transmitted light is received via a bi-furcated optic fiber reflectance probe.

3. The method according to claim 1, wherein transmitting light to a plurality of shaft surface locations on a turbomachinery system comprises transmitting light to an optical encoded turbomachine shaft surface.

4. The method according to claim 3, wherein determining at least one turbomachinery system shaft torque or vibration characteristic based on at least one characteristic of the reflected signals comprises:
  determining a shaft twist angle value based on the plurality of reflected signal signatures; and
  determining a turbomachinery system shaft torque based on a shaft twist angle value corresponding time delay or phase shift by differentiating any two reflectance signatures.

5. The method according to claim 4, wherein determining a shaft twist value based on the plurality of reflected signals comprises:
  measuring when a difference between reflectance pattern signatures of reflected light signals detected via a plurality of reflectance probes at a desired wavelength of interest exceeds a desired threshold via a photodetecting mechanism;
  determining differential time delays associated with the reflected signal signature; and
  determining a shaft twist angle value based on the reflected signal differential time delays from their reflectance pattern recognition.

6. The method according to claim 4, wherein determining a turbomachinery system shaft torque based on the shaft twist angle value comprises calibrating an industry accepted gold standard torque sensor for use with the respective turbomachinery system shaft such that the twist angle value corresponds to an absolute value of torque retrieved from a look-up table or from a formulas, or from a calibration transfer function.

7. The method according to claim 4, wherein determining a turbomachinery system shaft torque based on the shaft twist angle value comprises calculating a torque value based on the twist angle value.

8. The method according to claim 7, wherein determining a turbomachinery system shaft torque based on the shaft twist angle value further comprises calibrating out any differences between reflectance signals received from different locations along the at least one turbomachinery system shaft such that no measurable differences exist between measured signals associated with the optic fibers while the at least one shaft is stationary and prior to calculating the torque value.

9. The method according to claim 3, wherein determining a turbomachinery system shaft torque or vibration characteristic based on at least one characteristic of the reflected signals comprises:
  determining a turbomachinery system shaft fundamental vibration frequency and a desired number of higher order harmonic turbomachinery system shaft vibration frequencies based on the plurality of received reflectance signals; and
  determining a turbomachinery system shaft torsional vibration based on the shaft fundamental vibration frequency and shaft higher order harmonic shaft vibration mode frequencies.

10. The method according to claim 1, wherein determining a turbomachinery system shaft torque or vibration characteristic based on at least one characteristic of the reflected signals comprises:
  determining a turbomachinery system shaft fundamental vibration frequency and a desired number of higher order harmonic turbomachinery system shaft vibration mode frequencies based on the plurality of received reflectance signals; and
  determining a turbomachinery system shaft flexural vibration based on the shaft fundamental vibration frequency and shaft higher order harmonic shaft vibration frequencies.

11. The method according to claim 1, wherein transmitting light to a plurality of shaft surface locations on a turbomachinery system via a plurality of optic fiber bundles, the plurality of shaft surface locations together arranged in a substantially axial direction between the ends of at least one turbomachinery system shaft, such that a plurality of light signals are reflected from the plurality of locations while at least one shaft is rotating, comprises transmitting light via a multifurcated fiber bundle element and, receiving reflected light via a bifurcated fiber bundle element, and further wherein each optic fiber bundle associated with a shaft location is coupled to a respective reflectance probe placed in close proximity to the surface of the at least one turbomachinery shaft.

12. The method according to claim 1, wherein transmitting light to a plurality of shaft surface locations on a turbomachinery system via a plurality of optic fiber bundles, the plurality of shaft surface locations together arranged in a substantially axial direction between the ends of at least one turbomachinery shaft, such that a plurality of light signals are received from the plurality of locations while the at least one shaft is rotating, comprises transmitting light from a light source selected from a single wavelength light source, a LED light source, a broadband light source, and a multi-chromatic light source, operating either in continuous mode or in frequency modulated pulsed mode.

13. A system for sensing turbomachinery system shaft static and dynamic torques, vibration modes and associated operation status, the sensing system comprising:
  a single light source configured to transmit light to a surface of at least one turbomachinery system shaft through a plurality of optical fiber bundles disposed at a plurality of locations in proximity to the surface of the at least one shaft, the plurality of locations together arranged in a substantially axial direction between the ends of the at least one shaft;
  at least one high-temperature fiber bundle-based lensless reflectance sensing probe configured to detect dynamic light reflected from the at least one turbomachinery system shaft surface in response to the transmitted light during rotation of the at least one turbomachinery system shaft and generate dynamic reflected light signals there from; and
  a sensing mechanism configured to determine a torque and a vibration on the at least one turbomachinery system shaft in response to the dynamic reflected light signal signatures or pattern recognition based on time-domain and frequency-domain signal processes,
  wherein the turbomachinery shaft comprises an encoding mechanism implemented via an altered texture defined by a v-groove inscribed into the surface of the shaft by altering the surface depth of desired shaft surface areas relative to other shaft surface areas on at least one location of the at least one shaft in proximity to a respective fiber bundle location but not all locations of the at least one shaft in proximity to respective fiber bundle locations, wherein the depth of the v-groove provides a front working point signal and a rear working point signal such that a corresponding time delay can be detected from any two v-groove locations to determine the shaft twist angle value by differentiating their reflectance pattern signatures during each rotating cycle.

14. The system according to claim 13, wherein the at least one turbomachinery system shaft is optical encoded.

15. The system according to claim 14, wherein the vibration is a torsional vibration.

16. The system according to claim 14, wherein the optical encoded shaft comprises an optical encoding mechanism attached onto or embedded into the surface of the shaft either by directly laser micromachining, laser marking or welding.

17. The system according to claim 14, wherein the optical encoded shaft comprises an optical encoding mechanism implemented such that the optical encoding mitigates fault signal detection from rusted or dirty contaminated shaft surface areas.

18. The system according to claim 13, wherein the vibration is a flexural vibration.

19. The system according to claim 13, wherein the light source is selected from a single wavelength light source, a LED light source, a broadband superluminescent light source, and a multi-chromatic light source.

20. The system according to claim 13, wherein each optical fiber transmission line comprises a multi-furcated fiber bundle selected from plastic fibers, silica fibers, and sapphire fibers.

21. The system according to claim 13, wherein the at least one high-temperature fiber bundle-based lensless reflectance sensing probe comprises a silicon-based photo sensor array for visible signal detection.

22. The system according to claim 13, wherein the at least one high-temperature fiber bundle-based lensless reflectance sensing probe comprises a silicon-based charge-couple detector (CCD) or CMOS for visible signal detection.

23. The system according to claim 13, wherein the at least one high-temperature fiber bundle-based lensless reflectance sensing probe comprises a InGaAs or InGaNP based PIN diode or avalanche detector or arrays for near infrared signal detection.

24. The system according to claim 13, further comprising a 1×2 or 1×N reflectance probe corresponding to each optical fiber, each reflectance probe configured to transmit light received from the light source along its corresponding optical fiber bundle to the surface of the at least one shaft via a transmission leg of the reflectance probe and further configured to receive light reflected from the surface of the at least one shaft via a measurement leg of the reflectance probe.

25. The system according to claim 13, wherein the sensing mechanism comprises an industry accepted gold standard torque sensor for use with the respective at least one turbomachinery system shaft such that a measured shaft twist angle value corresponds to an absolute value of torque retrieved from a look-up table or from a formulas, or from a calibration transfer function.

26. The system according to claim 13, wherein the sensing mechanism comprises a signal processor configured to determine when the reflectance signatures of received light at a desired wavelength of interest exceeds a desired threshold, determine differential time delays associated with the reflected signal signatures, determine a shaft twist angle value based on the reflected signal differential time delays, and determine a shaft torque based on the shaft twist angle.

27. The system according to claim 26, wherein the signal processor with reflectance signal pattern recognition is further configured to calibrate out any differences between desired reflected signals to mitigate undesired measurable differences between the desired reflected signals.

* * * * *